US008970455B2

(12) United States Patent
Thorson et al.

(10) Patent No.: US 8,970,455 B2
(45) Date of Patent: Mar. 3, 2015

(54) SYSTEMS AND METHODS FOR PROCESSING CONTENT DISPLAYED ON A FLEXIBLE DISPLAY

(75) Inventors: Dean E Thorson, Grayslake, IL (US); William P Alberth, Jr., Prairie Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 279 days.

(21) Appl. No.: 13/536,352

(22) Filed: Jun. 28, 2012

(65) Prior Publication Data

US 2014/0002419 A1 Jan. 2, 2014

(51) Int. Cl.
*G09G 3/20* (2006.01)
*G09G 3/30* (2006.01)

(52) U.S. Cl.
USPC .......... 345/55; 345/76; 345/87; 345/60; 345/74.1; 345/105; 345/106; 345/107; 345/173; 345/175

(58) Field of Classification Search
USPC .................................. 345/55–111
See application file for complete search history.

(56) References Cited

U.S. PATENT DOCUMENTS

| 5,656,785 | A  | * | 8/1997  | Trainor et al. ........... 73/862.46 |
| 6,245,590 | B1 |   | 6/2001  | Wine et al. |
| 6,256,131 | B1 |   | 7/2001  | Wine et al. |
| 6,285,489 | B1 |   | 9/2001  | Helsel et al. |
| 6,331,909 | B1 |   | 12/2001 | Dunfield |
| 6,353,689 | B1 | * | 3/2002  | Kanamaru et al. ........... 382/280 |
| 6,368,276 | B1 |   | 4/2002  | Bullis |
| 6,433,907 | B1 |   | 8/2002  | Lippert et al. |
| 6,445,362 | B1 |   | 9/2002  | Tegreene |
| 6,793,350 | B1 |   | 9/2004  | Raskar et al. |

(Continued)

FOREIGN PATENT DOCUMENTS

| EP | 0178460 A1 | 4/1986 |
| EP | 0899651 A2 | 3/1999 |

(Continued)

OTHER PUBLICATIONS

Jong-Wook Jung et al., "Mechanical Stability of Pixel-Isolated Liquid Crystal Mode in Flexible Display", 5th Int'l Meeting Informational Display Digest, Jul. 19-22, 2005, pp. 353-356, Seoul Korea.

(Continued)

*Primary Examiner* — Kevin M Nguyen
*Assistant Examiner* — Cory Almeida
(74) *Attorney, Agent, or Firm* — Morris & Kamlay LLP

(57) ABSTRACT

Systems and methods are provided for managing the display of content on a display screen (110) of an electronic device (100). According to certain aspects, a sensor (119) or a set of a plurality of sensors (225) generate image data corresponding to a user viewing the device. Further, in one embodiment, a film (111) generates electrical signals corresponding to a shape or configuration of the display screen. The electronic device can calculate a distortion parameter based on the electrical signals. In another embodiment, an additional set of the plurality of sensors generates image data, from which the electronic device can calculate the distortion parameter. The electronic device generates processed image data based on the viewing position and the distortion parameter, and displays the processed image data on the display screen in such a way that the content appears oriented and proportioned to the user viewing the display screen.

23 Claims, 13 Drawing Sheets

(56) References Cited

U.S. PATENT DOCUMENTS

| | | |
|---|---|---|
| 6,795,221 B1 | 9/2004 | Urey |
| 7,098,871 B1 | 8/2006 | Tegreene et al. |
| 7,164,368 B1 | 1/2007 | Ireland |
| 7,171,324 B1 | 1/2007 | Pleasant et al. |
| 7,443,380 B2* | 10/2008 | Nozawa ............. 345/156 |
| 7,986,397 B1 | 7/2011 | Tiemann et al. |
| 8,068,886 B2 | 11/2011 | Vartanian |
| 8,581,859 B2* | 11/2013 | Okumura et al. ......... 345/173 |
| 2001/0017687 A1 | 8/2001 | Rodriguez, Jr. et al. |
| 2002/0024708 A1 | 2/2002 | Lewis et al. |
| 2003/0016770 A1 | 1/2003 | Trans et al. |
| 2003/0058490 A1 | 3/2003 | Brotherton et al. |
| 2003/0142849 A1* | 7/2003 | Lemelson et al. ......... 382/104 |
| 2003/0231261 A1 | 12/2003 | Bassi et al. |
| 2004/0008191 A1* | 1/2004 | Poupyrev et al. ......... 345/184 |
| 2004/0135744 A1 | 7/2004 | Bimber et al. |
| 2005/0013328 A1 | 1/2005 | Jurgensen |
| 2005/0030393 A1 | 2/2005 | Tull |
| 2005/0052717 A1 | 3/2005 | Brotherton et al. |
| 2005/0200927 A1 | 9/2005 | Brotherton et al. |
| 2005/0285811 A1* | 12/2005 | Kawase et al. ............... 345/1.1 |
| 2005/0285963 A1* | 12/2005 | Misawa et al. .......... 348/333.06 |
| 2006/0161964 A1 | 7/2006 | Chung |
| 2006/0274036 A1* | 12/2006 | Hioki et al. ............. 345/156 |
| 2007/0009066 A1 | 1/2007 | Fredriksson |
| 2007/0247422 A1* | 10/2007 | Vertegaal et al. ........... 345/156 |
| 2007/0279590 A1* | 12/2007 | Ebisawa ................... 351/208 |
| 2008/0240286 A1 | 10/2008 | Zhang et al. |
| 2008/0303782 A1* | 12/2008 | Grant et al. ............... 345/156 |
| 2008/0309884 A1 | 12/2008 | O'Dor et al. |
| 2009/0005961 A1 | 1/2009 | Grabowski et al. |
| 2009/0015799 A1 | 1/2009 | Luciano |
| 2010/0053068 A1* | 3/2010 | Cohen et al. .............. 345/107 |
| 2010/0141852 A1 | 6/2010 | Jurik et al. |
| 2010/0228632 A1 | 9/2010 | Rodriguez |
| 2010/0238090 A1 | 9/2010 | Pomerantz et al. |
| 2011/0086680 A1 | 4/2011 | Kim et al. |
| 2011/0087256 A1 | 4/2011 | Wiener et al. |
| 2011/0102462 A1 | 5/2011 | Birnbaum |
| 2011/0227822 A1 | 9/2011 | Shai |
| 2012/0038613 A1* | 2/2012 | Choi ...................... 345/211 |
| 2012/0112994 A1* | 5/2012 | Vertegaal et al. ........... 345/156 |
| 2012/0235893 A1* | 9/2012 | Phillips et al. ............. 345/156 |

FOREIGN PATENT DOCUMENTS

| | | |
|---|---|---|
| EP | 2104374 B1 | 5/2010 |
| EP | 2333756 A1 | 6/2011 |
| JP | 2010211211 A | 9/2010 |
| WO | 0023832 A1 | 4/2000 |
| WO | 0237163 A1 | 5/2002 |
| WO | 0237164 A1 | 5/2002 |
| WO | 0237165 A1 | 5/2002 |
| WO | 0237166 A1 | 5/2002 |
| WO | 2010060741 A1 | 6/2010 |
| WO | 2010068820 A1 | 6/2010 |

OTHER PUBLICATIONS

Chris Davies, "AMOLED with Integrated Camera for Interactive Eyeglasses", http://www.slashgear.com/amoled-with-integrated-camera-for-interactive-eyeglasses-0546029/, Jun. 5, 2009, 5 pages.

Patent Cooperation Treaty, "PCT Search Report and Written Opinion of the International Searching Authority" for International Application No. PCT/US2013/042138, Aug. 14, 2013, 8 pages.

* cited by examiner

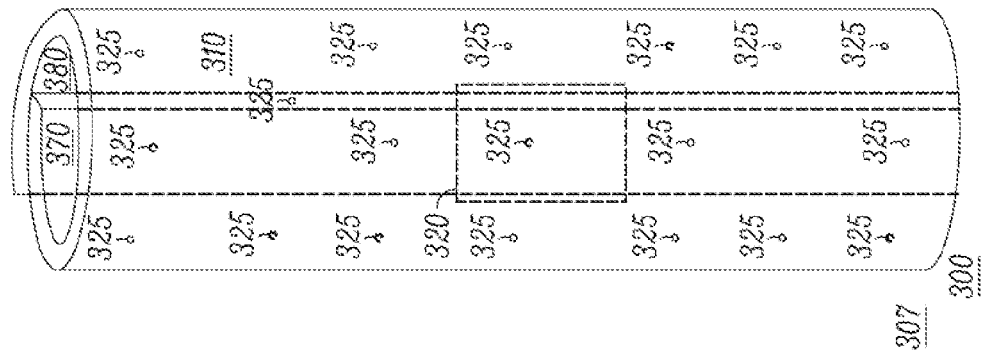
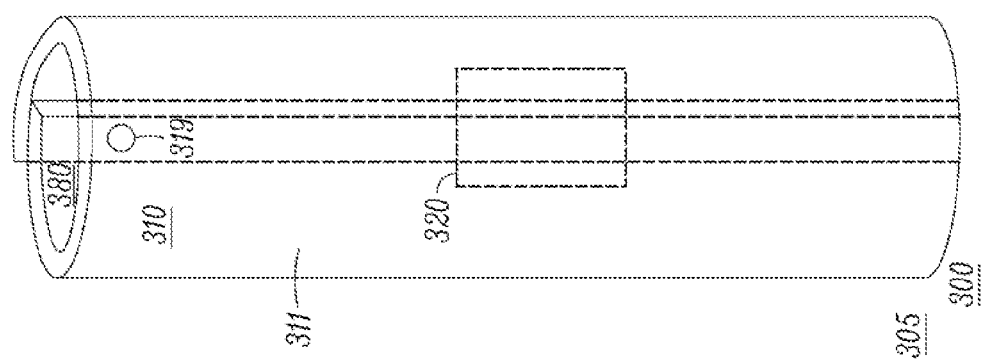

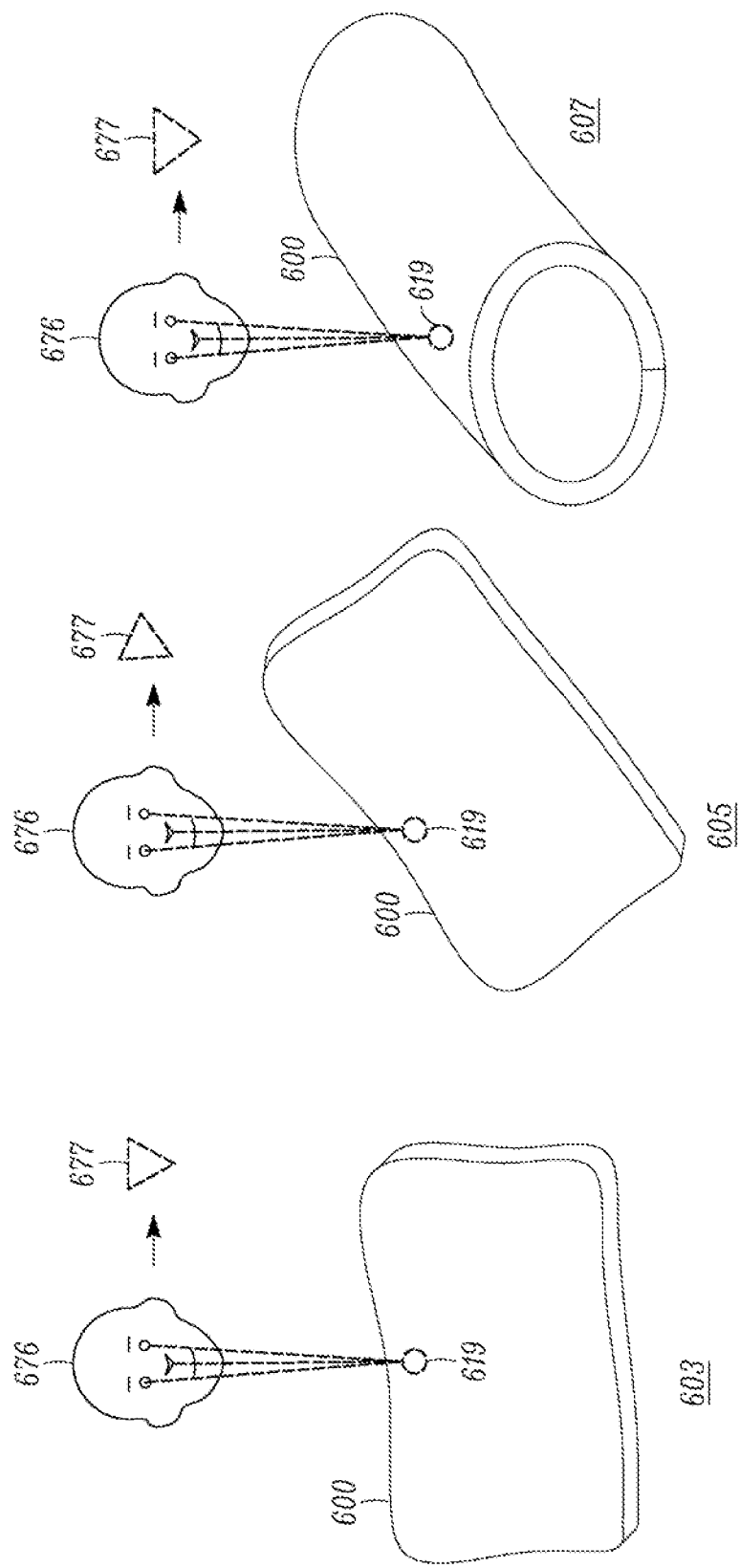

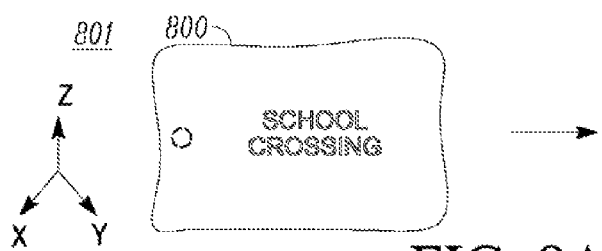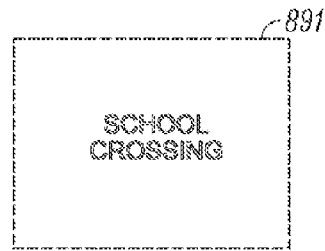
FIG. 8A
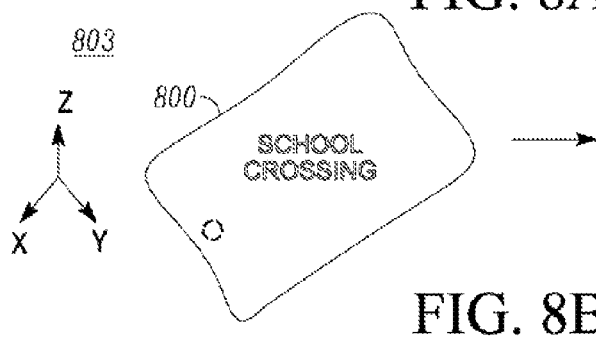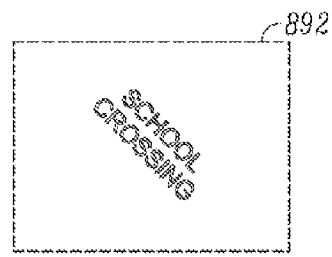
FIG. 8B
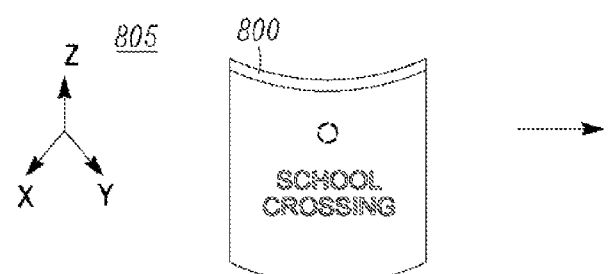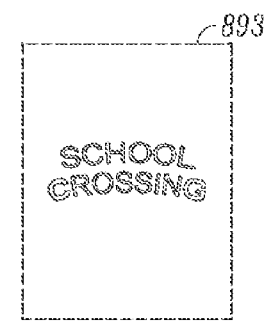
FIG. 8C
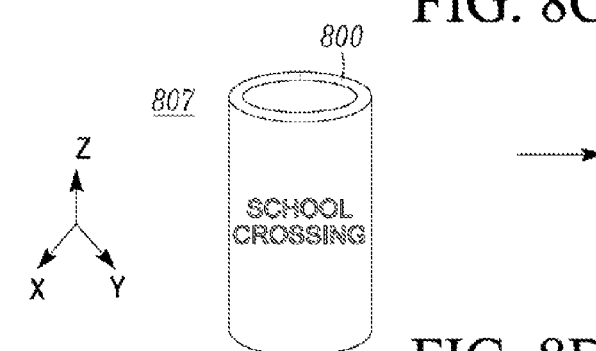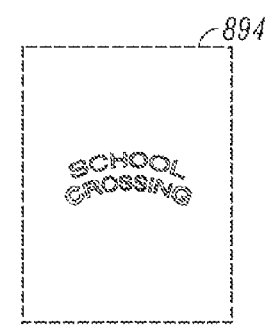
FIG. 8D
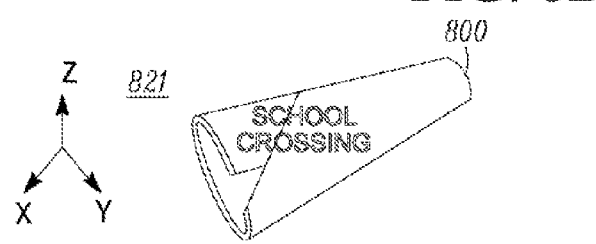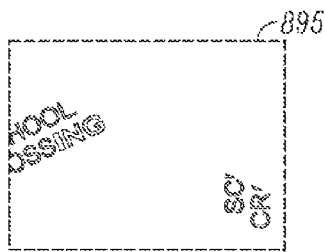
FIG. 8E

SYSTEMS AND METHODS FOR PROCESSING CONTENT DISPLAYED ON A FLEXIBLE DISPLAY

FIELD

This application generally relates to managing content displayed on electronic devices. In particular, the application relates to platforms and techniques for processing image data to display on a flexible display based on user viewing positions and distortion parameters.

BACKGROUND

Current electronic devices can include display screens capable of displaying various content. For example, electronic devices can display visual content such as text, images, and the like, that can be associated with various applications and functionalities of the electronic devices. The visual content is helpful to communicate information to users of the electronic devices and to allow the users to navigate throughout the applications and functionalities using a graphical user interface (GUI).

With the advent of flexible display technology for electronic devices, the display of content on the electronic device can be disrupted. For example, the content may appear difficult to read, obstructed, and/or the like as a result of the configuration of the flexible display and/or the viewing position of a user. Accordingly, there is an opportunity to manage the display of content on a flexible display.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 3A and FIG. 3B illustrate an example electronic device in accordance with some embodiments.

FIGS. 6A, 6B, and 6C illustrate examples of a user interaction with an electronic device in accordance with some embodiments.

FIGS. 8A, 8B, 8C, 8D, and 8E illustrate example content displays associated with an electronic device in accordance with some embodiments.

DETAILED DESCRIPTION

System and methods are disclosed for managing the display of content on a flexible display of an electronic device. More particularly, the electronic device can process image data that is particularly directed toward a user viewing the flexible display as well data corresponding to a shape of the flexible display, and the electronic device can display the processed image data such that the displayed image data should not appear distorted to the user viewing the flexible display. According to embodiments, the flexible display can be rolled into a tube-like or oblique shape with the display screen as an outer surface. The systems and methods can analyze image data generated by one or more sensors to determine a viewing position of a user viewing the display screen. Further, various components, such as a film or a plurality of sensors, can estimate or approximate the flex, curve, or shape of the flexible display. Based on the viewing position and the flex, curve, or shape of the flexible display, the systems and methods can generate the processed image data to display on the flexible display.

These content display management techniques improve the appearance and accuracy of content displayed on a flexible display by generating and depicting processed content that appears "normal" and proportional to a user viewing the flexible display from a certain viewing position. The systems and methods accommodate for various shapes and configurations of the flexible display. Further, the systems and methods can dynamically update the displayed image data based on movements of the user, movements of the device, the content itself, privacy considerations, and/or other factors.

Figure 1:
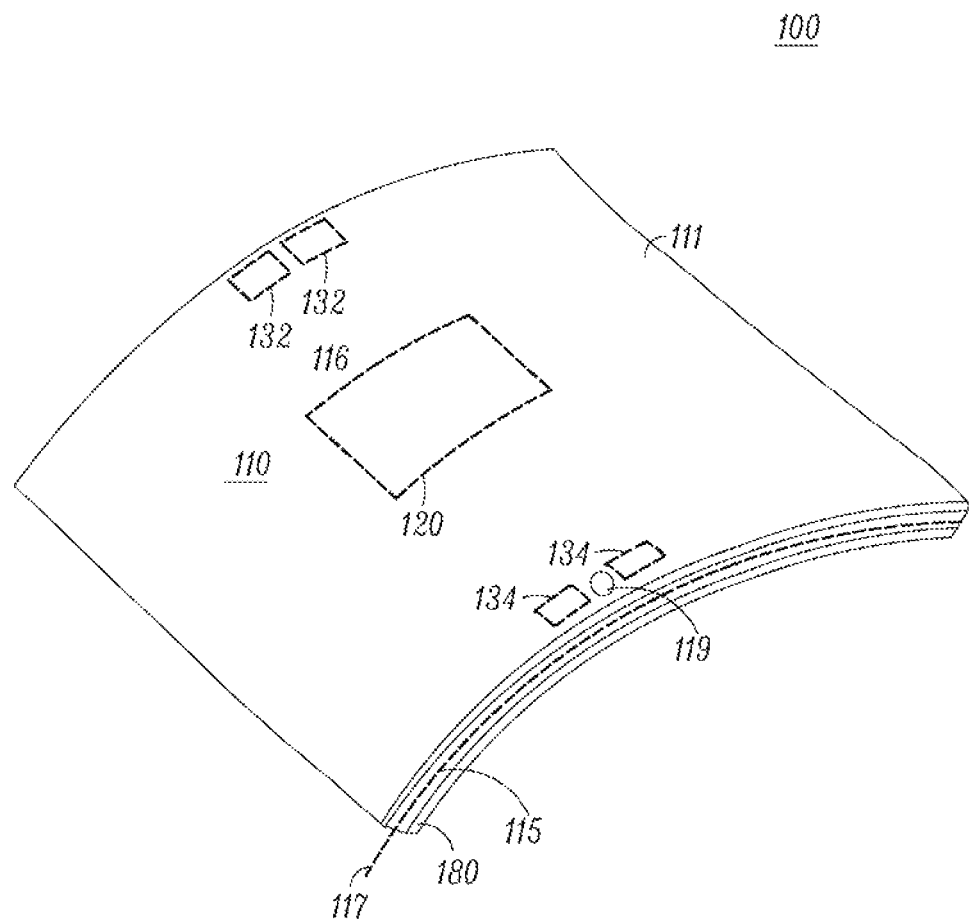
FIG. 1 illustrates an example electronic device in accordance with some embodiments.

FIG. 1 depicts an example electronic device 100 consistent with some embodiments. It should be appreciated that the electronic device 100 is merely an example and can include various combinations of hardware and/or software components.

As shown in FIG. 1, the electronic device 100 can include a display screen 110. According to embodiments, the display screen 110 can be flexible, partially flexible, rollable, or partially rollable and can be configured to display graphical information. Further, the display screen 110 can be a touchscreen capable of receiving inputs from a user of the electronic device 100. More particularly, the display screen 110 can include touchscreen technologies such as resistive panels, surface acoustic wave (SAW) technology, capacitive sensing (including surface capacitance, projected capacitance, mutual capacitance, and self-capacitance), infrared, optical imaging, dispersive signal technology, acoustic pulse recognition, piezoelectric and/or others. Further, the display screen 110 can use display technology such as electrophoretic displays, electronic paper, polyLED displays, AMOLED displays, OLED displays, liquid crystal displays, electrowetting displays, rotating ball displays, segmented displays, direct drive displays, passive-matrix displays, active-matrix displays, and/or others. In this embodiment, the flattened display screen 110 is rectangular in shape; however, any flattened shape is possible including circular, oval, triangular, polygonal, and irregular (e.g., like a flower, an alphanumeric character, or a leaf).

As shown in FIG. 1, the electronic device 100 can include a substrate 115 that can be configured to support the display screen 110. In particular, the substrate 115 can be a thin flexible layer made with metal, plastic, or other materials (or combinations of materials). The display screen 110 and the substrate 115 can individually include one or more parts or components for supporting the display functions such as, for example, backlights, reflectors, and/or other components.

The substrate 115 may also include an artificial muscle 117 that will later be explained in more detail. The electronic device 100 can further include a flexible battery 180 capable of rolling or flexing in conjunction with the display screen 110 and the substrate 115. The electronic device 100 can be rolled such that either the display screen 110 or the flexible battery 180 can form at least a part of the outer surface of the electronic device 100. The electronic device 100 can also include a processing module 120 that can be an integrated circuit containing a processor and other components configured to process user input and sensor data, and manage content display functionalities as discussed herein. As shown in FIG. 1, the processing module 120 can be located underneath or adjacent to the flexible battery 180, or can be located in other areas.

As shown in FIG. 1, the electronic device 100 is further configured with a sensor 119 that can be any type of imaging sensor or detection component, such as a camera or proximity sensor, that can aid in locating objects and detecting changes in positions of objects in proximity to the electronic device 100. For example, the sensor 119 can interface with the processing module 120 to identify a user's viewing position in relation to the electronic device 100 and/or the sensor 119 itself so that the processing module 120 can "follow" the user's movement around the outside of the electronic device 100. For further example, the sensor 119 can detect changes in the user's viewing position based on movements of the electronic device 100. In operation, the sensor 119 can be configured to sense a user, generate image data corresponding to the user, and provide the image data to the processing module 120.

The electronic device 100 is further configured with a film 111 that can be disposed in proximity to the display screen 110. Further, the film can coincide with some or all of the area corresponding to the display screen 110. In operation, the film 111 can be configured to generate an electrical signal in response to a force, pressure, acceleration, strain, flex, or the like exerted on or otherwise associated with the display screen 110 or other components of the electronic device 100. For example, if the display screen 110 is flexed in a certain direction, a corresponding area of the film 111 can sense the flex and generate an electrical signal(s) corresponding to the flex. The electrical signal can have an amplitude that corresponds to the amount of flex. In other words, the greater the amount of flex in the display screen 110, the greater the amplitude of the electrical signal. It should be appreciated that the film 111 can be any type of sensor, transducer, or the like capable of generating an electrical signal based on a force such as, for example, a piezoelectric film, polyvinylidene fluoride, or other materials with piezoelectric properties. The film 111 may be placed above or below the battery 180 or at another suitable position or location among the other layers of the electronic device 100.

According to embodiments, the electronic device 100 can support a variety of functionalities and applications. For example, the electronic device 100 can support communication functionalities such as telephone calls, text messaging, video calls, Internet browsing, emailing, and/or the like. In the embodiment shown in FIG. 1, piezo elements 132, 134 are positioned and configured to act as microphones and speakers for supporting telephony and other voice functions. For example, a first set of piezo elements 132 can act as microphones and a second set of piezo elements 134 can perform as speakers. Further, for example, the electronic device 100 can support applications such as games, utilities (e.g., calculators, camera applications, etc.), configuration applications, and/or the like. The electronic device 100 can also support voice-activation technology that allows users to initiate and operate functions and applications of the electronic device 100. In embodiments, the electronic device 100 can be configured to connect to various wired or wireless personal, local, or wide area networks to facilitate communication with network components and/or other devices.

According to embodiments, the processing module 120 of the electronic device 100 can be configured to manage the display of content on the display screen 110. In operation, the processing module 120 can receive image data generated by the sensor 119 and analyze the image data to determine a viewing position of the user relative to the sensor 119. Particularly, the processing module 120 can compare the image data corresponding to the user to a normal vector associated with the sensor 119 (e.g., a vector extending perpendicular from a lens of the sensor 119) to determine an offset, displacement, or other metric between the normal vector and the image data, and calculate the viewing position based on the determination.

Further, the processing module 120 can detect an electrical signal generated by the film 111 to calculate a distortion parameter that estimates the shape or configuration of the display screen 110. Still further, the processing module 120 can generate processed image data based on the viewing position of the user and the distortion parameter, and display the processed image data on the display screen 110. More particularly, the processed image data is displayed in such a way that it appears oriented and proportioned to the user viewing the display screen 110 from the viewing position. In embodiments, the sensor 119 can generate image data corresponding to the user resulting from a movement of the user and/or the electronic device 100, and the processing module 120 can update the processed image data accordingly.

Figure 2:
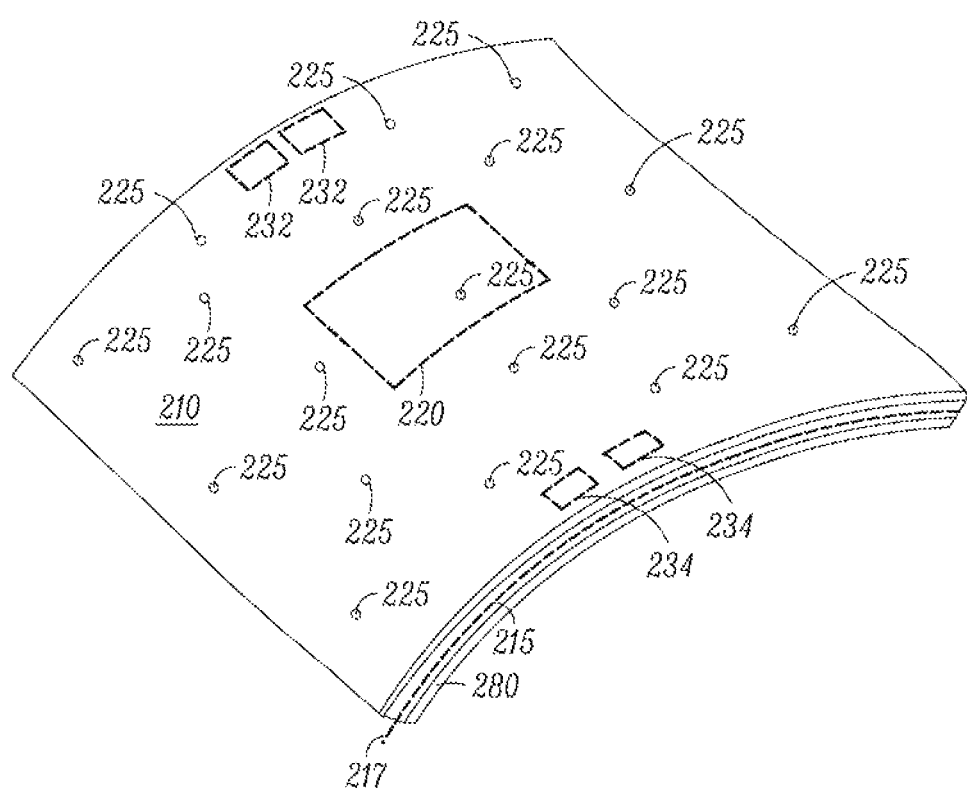
FIG. 2 illustrates an example electronic device in accordance with some embodiments.

FIG. 2 depicts an example electronic device 200 consistent with some embodiments. It should be appreciated that the electronic device 200 is merely an example and can include various combinations of hardware and/or software components.

As shown in FIG. 2, the electronic device 200 can include a display screen 210, processing module 220, a substrate 215, an artificial muscle 217, a flexible battery 280, and piezo elements 232, 234, which can be the same or similar to the corresponding components as described with respect to FIG. 1. The electronic device 200 can further include a plurality of sensors 225 that can be placed on or embedded within the display screen 210. It should be appreciated that the placement of the plurality of sensors 225 is merely an example and can include other combinations, placements, or amounts of sensors.

According to some embodiments, the plurality of sensors 225 can be any type of imaging sensor or detection component, such as a camera or proximity sensor, that can aid in locating objects and detecting changes in positions of objects in proximity to the electronic device 200. For example, the sensors 225 can be photodiodes that can be integrated among display pixels of the display screen 110. Similar to the sensor 119 of FIG. 1, one or more of the plurality of sensors 225 can interface with the processing module 220 to identify a user's viewing position in relation to the electronic device 200 and/or one or more of the plurality of sensors 225 themselves so that the processing module 220 can "follow" the user's movement around the outside of the electronic device 200. Further, the plurality of sensors 225 can detect changes in the user's viewing position based on user movements or movements of the electronic device 200.

The plurality of sensors 225 can be configured to interface with the processing module 220 to estimate a distortion, shape, or configuration of the display screen 210. For example, the display screen 210 can be flattened, rolled, or shaped in other configurations, and the processing module 220 can estimate or calculate the shape of the display screen 210 based on image data detected by one or more of the plurality of sensors 225. In embodiments, the image data can include data corresponding to the user viewing the device and/or other physical objects in proximity to the electronic device 200.

For example, the processing module 220 of the electronic device 200 can be configured to manage the display of content on the display screen 210. In operation, a first set of the plurality of sensors 225 can generate image data including images of the user. The processing module 220 can analyze the image data from the first set of sensors to determine a viewing position of the user relative to the first set of sensors. Particularly, the processing module 220 can compare the image data to normal vectors associated with the first set of sensors (e.g., vectors extending perpendicular from the first set of sensors) to determine an offset, displacement, or other metric between the normal vector(s) and the image data, and calculate the viewing position of the user based on the determination.

As another example (which may be used in conjunction with the previous example), a second set of the plurality of sensors 225 can generate image data including images of the user (or another object), and the processing module 220 can analyze the image data from the second set of sensors to calculate a distortion parameter that estimates the shape or configuration of the display screen 210. Particularly, the processing module 220 can analyze the image data to identify different views of the same recurring object (e.g., the user), can indicate a position of the user relative to each of the second set of sensors, and can compare that user image data to estimate any physical bend, configuration, or shape associated with the display screen 210 at locations corresponding to each of the second set of sensors. In this manner, at least two sensors 225 may capture images of the same object from different viewing angles. The processing module 220 can then determine a curvature between the two sensors 225 based on a known distance between the two sensors 225 and the differences between the two images of the same object. The processing module 220 can calculate the distortion parameter based on the physical bend, configuration, or shape estimations or calculations. It should be appreciated that the distortion parameter can be any type of data, for example a matrix having values corresponding to the physical bend, configuration, or shape estimations or calculations for each of the second set of sensors.

The processing module 220 can generate processed image data based on the viewing position of the user and the distortion parameter, and display the processed image data on the display screen 210. More particularly, the processed image data is displayed in such a way that it appears oriented and proportioned to the user viewing the display screen 210 from the viewing position. In embodiments, a third set of the plurality of sensors 225 can generate image data corresponding to the user resulting from a movement of the user and/or the electronic device 200, and the processing module 120 can update the processed image data accordingly. It should be appreciated that the first, second, third, and any additional sets of the plurality of sensors 225 as described herein can partially or totally overlap with each other, or can be distinct from each other. Further, the amount of sensors in the first, second, third, and any additional sets of the plurality of sensors 225 can vary.

FIG. 3A and FIG. 3B depict views of an example electronic device 300 shown in two configurations 305, 307 in accordance with embodiments. The configurations 305, 307 depict a rectangular flexible display rolled into a tube-like shape. Further, the configurations 305, 307 as depicted in FIG. 3A and FIG. 3B have a display screen 310 as the outside surface and a flexible battery 380 as the inside surface. Similarly, a processing module 320 can be located on the inside surface of the electronic device 300 in each of the configurations 305, 307. It should be appreciated that other rollable configurations are envisioned, including cone-like shapes, tear drop-like shapes, or other oblique shapes (see FIGS. 7 and 8). Further, in cases in which the electronic device is rectangular in shape, the embodiments envision the configurations 305, 307 as being rolled either "long-wise" or "short-wise."

The configuration 305 shows the electronic device 300 with a sensor 319 and a film 311 disposed in proximity to part or all of a display screen 310 (such as the electronic device 100 as discussed with respect to FIG. 1). As discussed herein, the sensor 319 can be configured to detect a user viewing the display screen 310 from a viewing position and generate image data corresponding to the user. Further, the film 311 is configured to sense a force associated with a flex, bend, shape, or configuration of the display screen 310, and convert the force into an electrical signal(s). For example, the film 311 can generate electrical signals corresponding to forces at various locations of the film 311 and according to the rolled-up shape as depicted in the configuration 305. The processing module 320 can analyze the data from the sensor 319 and the electrical signal(s) from the film 311 to generate processed image data and display the processed image data on the display screen 310, as discussed herein.

The configuration 307 shows the electronic device 300 with a plurality of sensors 325 disposed over part or all of the display screen 310 (such as the electronic device 200 as discussed with respect to FIG. 2). As discussed herein, a first set of the plurality of sensors 325 can be configured to detect a user viewing the display screen 310 from a viewing position and generate image data corresponding to the user. Further, a second set of the plurality of sensors 325 can also be configured to detect the user and generate additional image data corresponding to the user. Particularly, the additional image data from the second set of sensors can indicate the user's viewing position relative to a normal vector of each of the second set of sensors. The processing module 320 can analyze the image data from the first set of sensors and the additional image data from the second set of sensors to generate processed image data and display the processed image data on the display screen 310, as discussed herein. Further, a third set of the plurality of sensors 325 can detect movements associated with the electronic device 300 or the user, and the processing module 320 can update the processed image data accordingly.

In embodiments, an additional set of sensors of the plurality of sensors 325 can detect an overlap area 370 of the display screen 310 where the display screen overlaps with itself, as shown in FIG. 3B. For example, the additional set of sensors can sense the flexible battery 380 blocking ambient light from reaching sensors location in a portion of the display screen 310 when the electronic device 300 is rolled in a tube-like or similar shape. The processing module 320 can analyze image data generated by the additional set of sensors and corresponding to the overlap area, and can modify the processed image data displayed on the flexible display to not display in the overlap area. Accordingly, any content that would normally display on the display screen 310 would not display within any overlap area of the display screen 310.

The electronic device in either configuration 305, 307 can further include a substrate that includes an artificial muscle component that can change shape or size when stimulated by an electric charge. For example, the artificial muscle can be an electroactive polymer made with piezoelectric materials that can deform when subject to a voltage application, and which also generates a voltage when deformed. In operation, the artificial muscle can activate or engage to hold the electronic device in a position. For example, the user can roll the electronic device into a tube-like shape, and the artificial muscle can activate to maintain the shape. In some cases, the bending of the artificial muscle by an external force (e.g., the user) can activate an electrical signal, and a polarity of the signal can indicate whether the electronic device is rolled with the flexible display as an inside surface or an outside surface.

Figure 4:
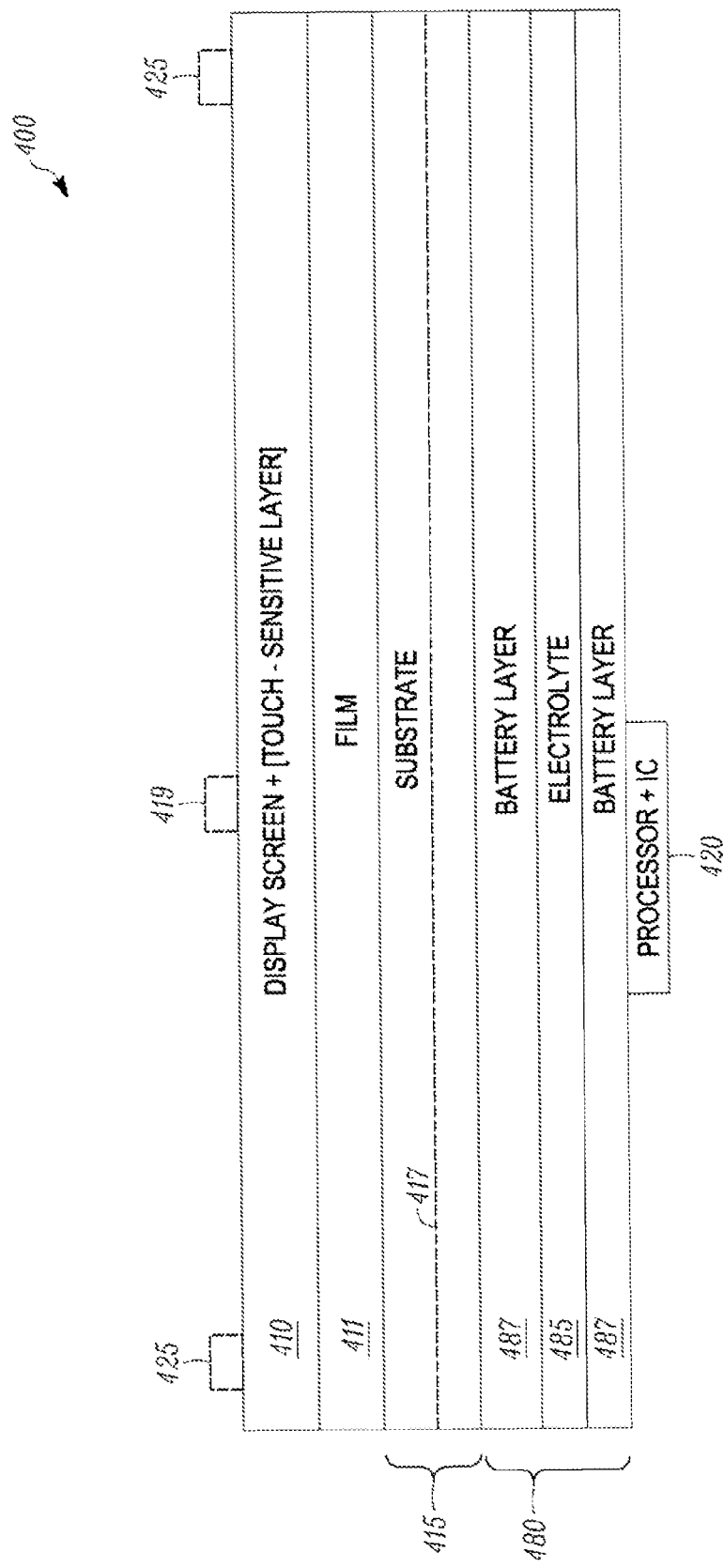
FIG. 4 illustrates an example of a cross-section view of an electronic device in accordance with some embodiments.

FIG. 4 depicts a cross-section view of an electronic device 400. It should be appreciated that the cross-section view is merely an example and the electronic device 400 can include various combinations of components and placements thereof.

As shown in FIG. 4, the electronic device 400 can include a display screen 410 with an optional touch-sensitive layer integrated therein. More particularly, the touch-sensitive layer can sense touch events with, for example, a user's hand. The electronic device 400 can also have, depending on the configuration, a sensor 419 or a plurality of distributed sensors 425, as discussed herein. In embodiments, the camera sensor 419 or the plurality of image sensors 425 can be disposed within the active matrix of the display screen 410. The electronic device 400 can further include an optional film 411 disposed in a proximity to the display screen 410. Particularly, the film 411 can be disposed across or over any area of the display screen 410, including a partial or entire area of the display screen 410. According to embodiments, the film 411 can be a piezoelectric film that can generate an electrical signal in response to a force exerted on the display screen 410. For example, if any area of the display screen 410 deforms, flexes, bends, and/or the like, the film 411 can detect the force and generate an electrical signal corresponding to the force. In some cases, the electrical signal can be commensurate to the degree of the force. In embodiments, the film 411 can have a plurality of associated location points that can each generate an electrical signal corresponding to a force exerted on the display screen 410 at that specific location.

The electronic device 400 can further include a substrate 415 that can be capable of supporting the display screen 410. The substrate 415 can include an artificial muscle 417 component that can change shape or size when stimulated by an electric charge. For example, the artificial muscle 417 can be an electroactive polymer made with piezoelectric materials that can deform when subjected to a voltage application, and which also generates a voltage when deformed. In operation, the artificial muscle 417 can activate or engage to hold the electronic device 400 in a position. For example, the user can roll the electronic device 400 into a tube-like shape, and the artificial muscle 417 can activate to maintain the shape. In some cases, the bending of the artificial muscle 417 by an external force (e.g., the user) can activate an electrical signal, and a polarity of the signal can indicate whether the electronic device 400 is rolled with the display screen 410 as an inside surface or an outside surface.

The electronic device 400 can be powered by a battery 480 including one or more battery layers 487 and an electrolyte layer 485. In embodiments, the battery layers 487 can be lithium-ion batteries or other battery types or variants, and can be made using various types of conductive material. Further, in embodiments, the electrolyte layer 485 can include LiPON or other materials or combinations of materials. It should be appreciated that although the battery is depicted as having two battery layers 487 and one electrolyte layer 485, embodiments contemplate various amounts and combinations of layers, as well as various materials and compositions thereof. In embodiments, the battery layers 487 and the electrolyte layer 485 can be laminated or otherwise affixed to the substrate 415 or other components of the electronic device 400.

According to some embodiments, the electronic device 400 can have a processing module 420 disposed on the battery layer 487. In operation, the processing module 420 can include an integrated circuit, a processor, and other components, and can be configured to interface with the battery layers 487, the artificial muscle 417, the film 411, the display screen 410, the sensor 319, and the plurality of image sensors 425 to process and facilitate the operations and functionalities of the electronic device 400 as discussed herein.

Figure 5A:
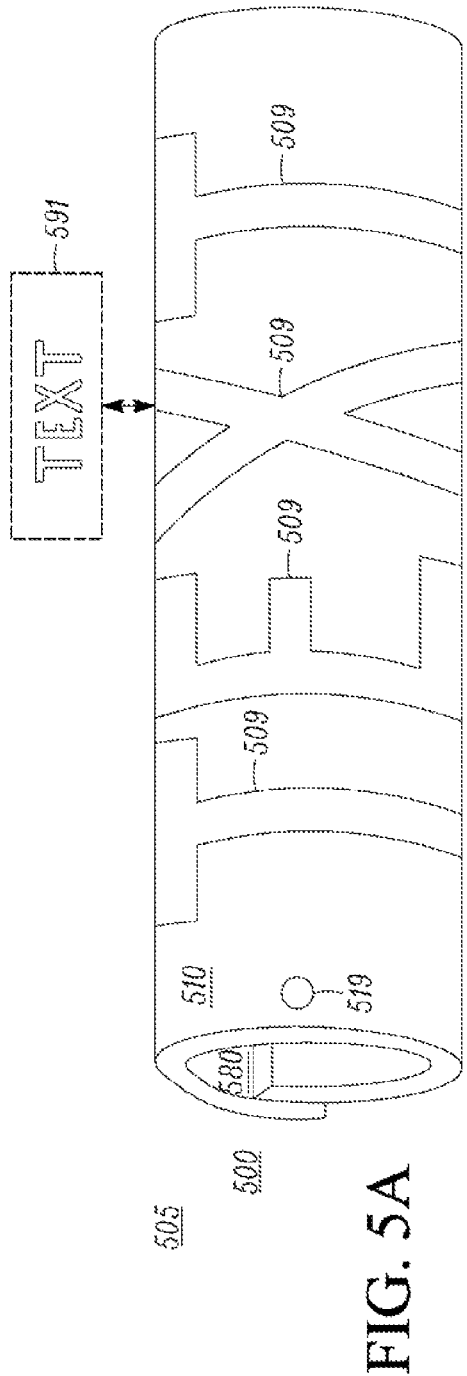
FIG. 5A and FIG. 5B illustrate examples of content displayed on an electronic device in accordance with some embodiments.
Figure 5B:
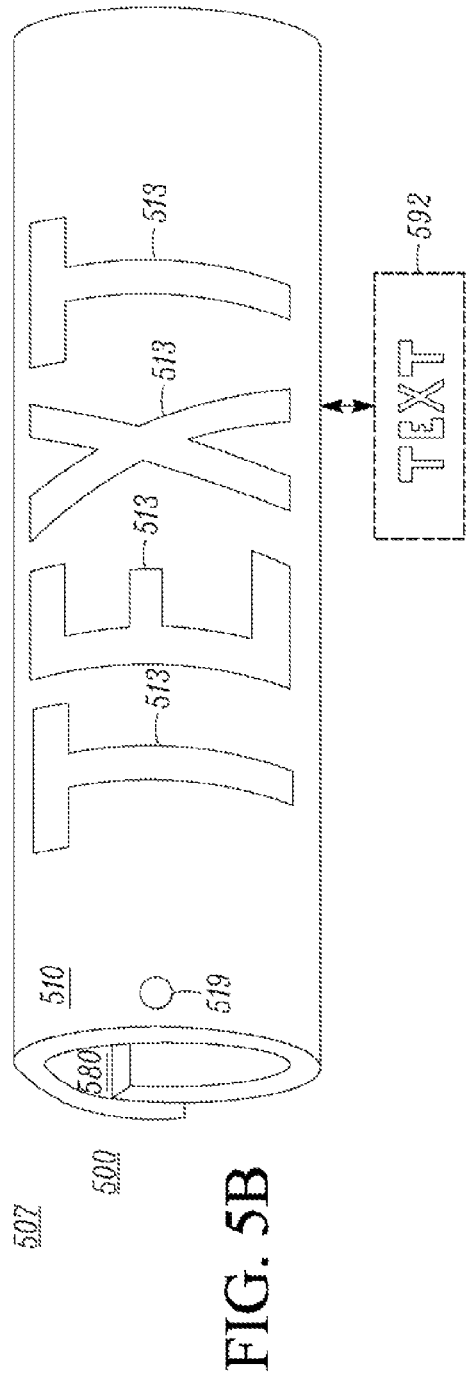
Figure 7A:
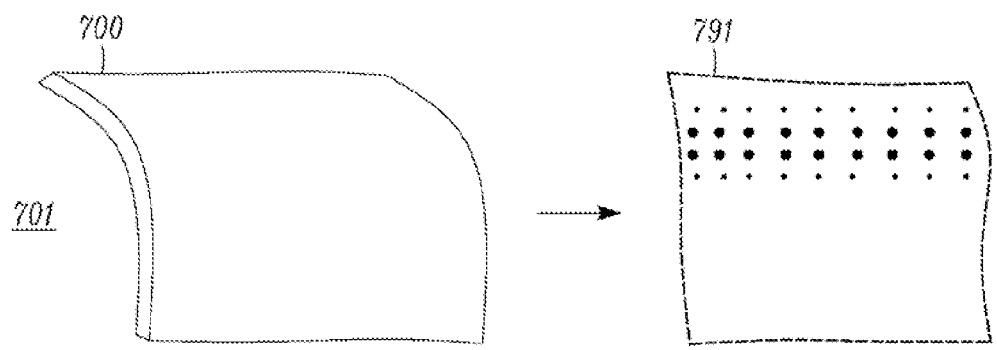
FIGS. 7A, 7B, 7C, and 7D illustrate example mappings associated with configurations of an electronic device in accordance with some embodiments.
Figure 7B:
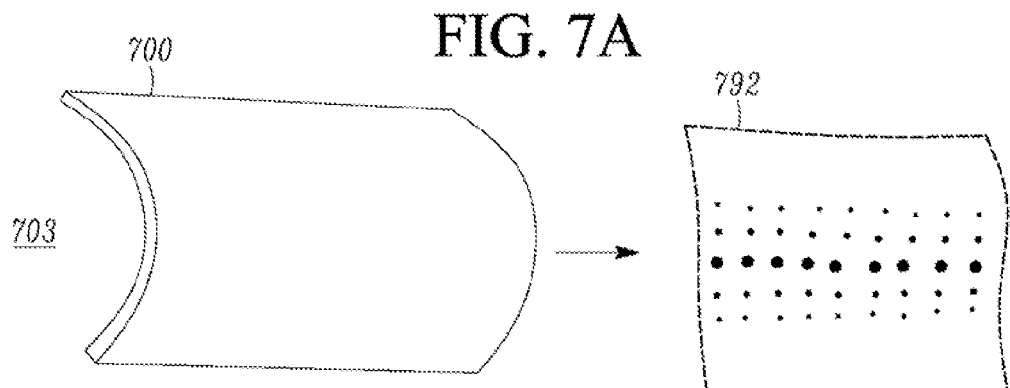
Figure 7C:
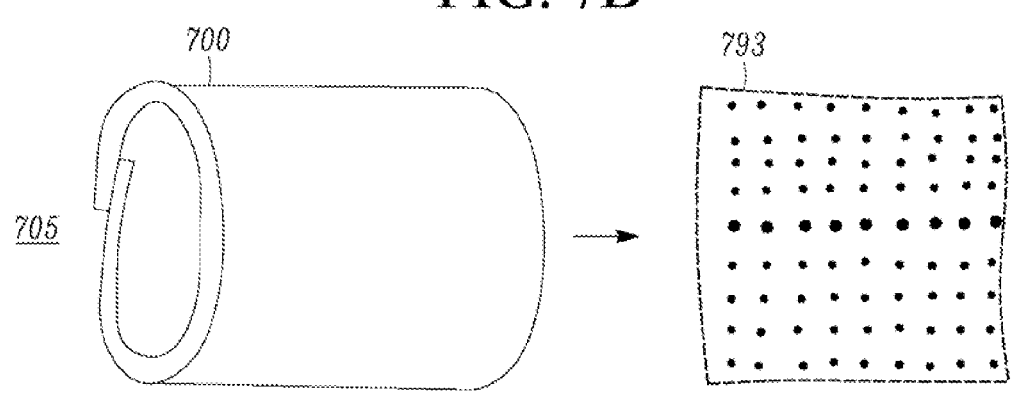
Figure 7D:
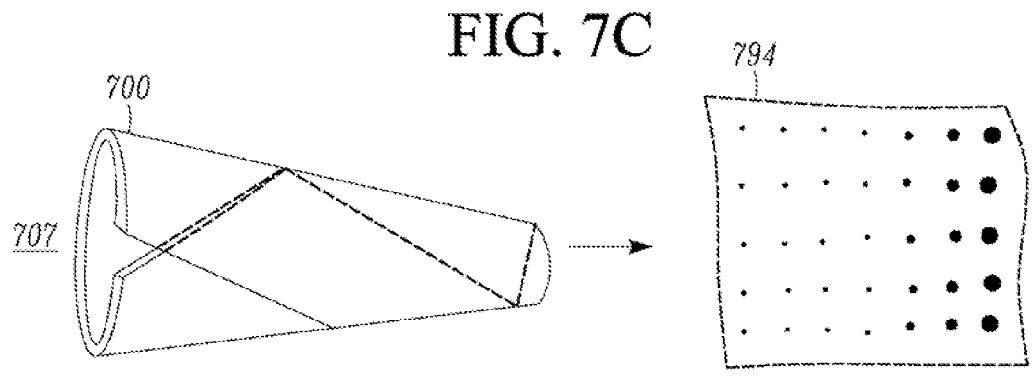

FIG. 5A and FIG. 5B depict views of an example electronic device 500 shown in two configurations 505 (FIG. 5A), 507 (FIG. 5B) in accordance with embodiments. Each of the configurations 505, 507 shows a rectangular flexible display 510 (such as the display screen 110) rolled into a tube-like shape. Further, each of the configurations 505, 507 depicts the flexible display 510 as the outside surface and a battery 580 as the inside surface, and each includes an optical sensor 519 disposed on the flexible display 510. It should be appreciated that other rollable configurations are envisioned, including cone-like shapes, tear drop-like shapes, or other oblique shapes (see FIGS. 7 and 8).

Each of the configurations 505, 507 has a respective virtual display mapping 591, 592 that corresponds to the display content of a flattened display screen. More particularly, the virtual display mappings 591, 592 are representations of how the content displayed on the flexible displays 510 in the rolled-up configurations 505, 507 would appear if the electronic devices 500 were flattened into a rectangle shape or similar flattened shape. Referring to configuration 505 of FIG. 5A, the virtual display mapping 591 includes the letters "TEXT" that appear to be a normal height, width, and overall balance when viewed from a straight-on perspective. However, the flexible display 510 shows the corresponding letters "TEXT" 509 that, when observed, appear to extend past the viewable top and bottom edges of the flexible display 510. In other words, because of the rolled-up configuration of the flexible display 510, the letters "TEXT" 509 are not effectively displayed on the flexible display 510 to allow a user to clearly and accurately view and/or perceive the text while the electronic device 500 is in the rolled-up configuration.

Referring to configuration 507 of FIG. 5B, the virtual display mapping 592 depicts the letters "TEXT" that appear more compressed than the letters "TEXT" in the counterpart virtual display mapping 591. Further, the letters "TEXT" in the virtual display mapping 592 appear more extended or distorted near the top and bottom of the letters. For example, the top and bottom of the letter "E" appears more elongated than the middle of the letter "E." However, when the content of the virtual display mapping 592 is "projected" on the flexible display 510 of configuration 507, the letters "TEXT" 513 appear to be balanced in height and width when viewed from a straight-on perspective. Particularly, because the letters "TEXT" are compressed in the virtual display mapping 592, the letters "TEXT" 513 as displayed on the flexible display 510 do not extend past the viewable top and bottom edges of the flexible display 510. Further, the curvature of the flexible display 510 causes the letters "TEXT" 513 to appear balanced and non-distorted, even though the letters of the virtual display mapping 592 are distorted.

FIGS. 6A, 6B, and 6C depicts views of an example electronic device 600 shown in three configurations 603 (FIG. 6A), 605 (FIG. 6B), 607 (FIG. 6C) in accordance with embodiments. Each electronic device 600 in the configurations 603, 605, 607 includes a sensor 619 capable of sensing respective users 676 viewing each electronic device 600 and generating image data corresponding to the respective users 676, as discussed herein. Although FIG. 6 depicts a single sensor embodiment, it should be appreciated that a distributed sensor embodiment, such as that depicted in FIG. 2, is capable of the same functionalities.

According to embodiments, each sensor 619 of the respective configurations 603, 605, 607 is configured to sense or detect various features of the user 676. For example, the sensor 619 can detect the eyes, ears, nose, mouth, chin, forehead, and/or other features of the user 676. As shown in FIG. 6, each sensor 619 detects each eye and the mouth of the respective users 676 and the respective locations of the eyes and mouth are recorded. Further, each sensor 619 can generate image data based on the respective locations of the eyes and mouth and a processing module of the electronic device 600 can process the image to determine a viewing location of each of the users 676. Particularly, the viewing location can be based on the angle, distance, and/or other metrics that correspond to the location from which the user 676 is viewing the display screen of the electronic device 600 relative to the sensor 619.

In some cases, the processing module can analyze the image data to generate a "plane" 677 having points corresponding to the detected features of the user 676, and can calculate the viewing location relative to the sensor 619 based on the plane 677. Particularly, the processing module can compare the coordinates of the plane 677 to a normal vector associated with the sensor 619 to determine the viewing location relative to the location and orientation of the sensor 619. As shown in FIG. 6, even though the electronic devices 600 of the configurations 603, 605, 607 are at different orientations, angles, configurations, or positions, the respective sensors 619 are able to generate image data corresponding to the users 676 from which the plane 677 can be calculated. In some versions, the electronic device 600 may have a reference image of the user stored in memory, and this reference image may be compared to the current image data to assist in determining the detected features and, subsequently, the user's current viewing location. Although not shown in FIG. 6, a distributed sensor embodiment can sense the user 676 and generate image data in a similar manner. Particularly, a set of the distributed sensors can sense the user 676 and generate image data that, when collectively analyzed by a processing module, can yield the plane 677 corresponding to the viewing position of the user 676.

FIGS. 7A, 7B, 7C, and 7D depict views of an example electronic device 700 shown in various configurations 701 (FIG. 7A), 703 (FIG. 7B), 705 (FIG. 7C), 707 (FIG. 7D) in accordance with embodiments. Particularly, each of the configurations 701, 703, 705, 707 depicts the electronic device 700 in different shapes and configurations. Further, each of the configurations 701, 703, 705, 707 has an associated signal mapping 791, 792, 793, 794 that depicts signals generated by a device flex or bend associated with the various shapes and configurations. As shown in FIG. 7, the associated signal mappings 791, 792, 793, 794 are two-dimensional depictions of the generated signals from a head-on perspective.

In embodiments, the signals of the signal mappings 791, 792, 793, 794 can be generated by a film, such as the film 411 as depicted in FIG. 4, disposed over some or all of the electronic device 700. Particularly, in specific locations of the flexible display of the electronic device 700 where there is a flex or bend, the film can generate a signal at that location. Further, an amplitude of the signal can be based on the amount of flex or bend such that the more flex or bend, the greater the amplitude of the signal. It should be appreciated that the layout and configuration of the signal locations of the signal mappings 791, 792, 793, 794 are merely an example, and other layouts are envisioned. Further, it should be appreciated that the respective signal mappings 791, 792, 793, 794 can dynamically update based on movements or rearrangements of the electronic device 700.

Referring to the signal mapping 791 corresponding to the configuration 701, the mapping depicts signals generated by the flex near the top edge of the electronic device 700. Further, referring to the signal mapping 792 corresponding to the configuration 703, the mapping depicts signals generated by the flex near the center of the electronic device 700. Still further, referring the signal mapping 793 corresponding to the configuration 705, the mapping depicts signals generated by the flex throughout the rolled-up electronic device 700. Moreover, referring the signal mapping 794 corresponding to the configuration 707, the mapping depicts signals generated by the flex throughout the rolled-up, conical-shaped electronic device 700. Particularly, the signals near the right side of the electronic device 700 have the greatest amplitude, as the flex near the narrow end of the electronic device 700 is the most pronounced.

It should be appreciated that the distributed sensor embodiment as described with respect to FIG. 2 can perform similar functions as the film depicted in FIG. 7. For example, the plurality of sensors can be distributed throughout the electronic device 700 similar to the signal mapping locations. Depending on the viewing position of a user and on the flex or bend of the electronic device 700, each of the plurality of sensors can generate various image data of the user that the processing module can analyze to determine or estimate the shape or configuration of the electronic device 700, as discussed herein.

FIGS. 8A, 8B, 8C, 8D, and 8E depict views of an example electronic device 800 shown in various configurations 801 (FIG. 8A), 803 (FIG. 8B), 805 (FIG. 8C), 807 (FIG. 8D), 821 (FIG. 8E) in accordance with embodiments. Particularly, each of the configurations 801, 803, 805, 807, 821 depicts the electronic device 800 in different shapes and configurations, and each displaying the text "SCHOOL CROSSING". Further, each of the configurations 801, 803, 805, 807, 821 has an associated virtual display mapping 891, 892, 893, 894, 895 that depicts a representation of how the "SCHOOL CROSSING" content displayed on the respective electronic devices 800 would appear if the electronic devices 800 were flattened into a rectangle shape or similar flattened shape. The configurations 801, 803, 805, 807, 821 depict content as it would be viewed by a user from a head-on perspective. More particularly, the content depicted in the virtual display mappings 891, 892, 893, 894, 895 is distorted such that when the electrical device is in respective configurations 801, 803, 805, 807, 821, the content appears "normal" to a user viewing the electronic device 800 from the particular viewing location (i.e., the head-on perspective). It can be assumed that the head-on perspective of the user is oriented according to the z-axis of the x-y-z axis depicted in FIG. 8. More particularly, the "tilt" of the user's head is aligned with the z-axis.

Referring to FIG. 8, configuration 801 depicts the electronic device 800 in a flattened shape. Accordingly, the virtual display mapping 891 has a one-to-one correspondence with the perceived content as displayed in the configuration 801. The subsequent configuration 803 depicts the electronic device 800 at an angle (e.g., if the user is angling the electronic device 800) and in a flattened shape. Accordingly, the virtual display mapping 892 includes the corresponding text at an angle without any shape distortion.

The configuration 805 depicts the electronic device 800 with a slight flex in the middle and without any tilt relative to the z-axis. Accordingly, the virtual display mapping 893 depicts distorted text to accommodate for the flex in the electronic device 800. Particularly, the letters near the outside of "CROSSING" (e.g., C, G) are wider than the letters near the centers of the words. Further, the width of the letters gradually increases as the length-wise distance from the flexed center of the electronic device 800 increases. The configuration 807 depicts the electronic device 800 in a rolled-up shape and without any tilt relative to the z-axis. To accommodate for the rolled-up shape, the corresponding text depicted in the virtual display mapping 894 is shrunken because the viewable space of the electronic device 800 is reduced. Further, because the outside edges of the viewable space of the electronic device 800 angle away from the user's viewing position, the letters near the outside of "CROSSING" (e.g., C, G) are wider than the letters near the centers of the words. Further, the width of the letters gradually increases as the length-wise distance from the center of the electronic device 800 increases.

The configuration 821 depicts the electronic device 800 in a rolled-up, conical shape with an overlap area, and with a tilt relative to the z-axis. The corresponding text depicted in the virtual display mapping 895 accommodates for the features of the configuration 821 in the following ways: 1) the text is shrunken because the viewable space of the electronic device 800 is reduced; 2) the text is angled with respect to the z-axis because the electronic device 800 is tilted with respect to the z-axis; 3) the letters near the outside of "CROSSING" (e.g., C, G) are wider than the letters near the centers of the words because the corresponding areas of the electronic device 800 angles away from the user; 4) the words are "split" because the viewable area of the electronic device 800 includes both the left and right sides of the display screen; and 5) there is a blank area on the left side of the virtual display mapping 895 because of the overlap in the configuration 821.

According to embodiments, the combinations of hardware and software components as described herein can manage the display of content on the associated electronic device. In one embodiment, the electronic device can include an optical sensor capable of sensing a user and generating image data corresponding to the user, and a film configured to generate electrical signals associated with a flexible display of the electronic device. In another embodiment, the electronic device can include a plurality of distributed sensors whereby various sets of the plurality of distributed sensors can sense a user and generate image data corresponding to the user, whereby the image data can be analyzed to both calculate a viewing position of the user as well as estimate a shape or configuration of the electronic device, specifically the shape or configuration of the flexible display. Because it can be the case that only some of the plurality of distributed sensors can sense a user or changes in user positions at a given point in time, it should be appreciated that the various sets of sensors can partially or completely overlap each other, or can be distinct from each other.

The embodiments as described herein can further detect movements associated with the electronic device and/or the user. For example, the user can alter his/her head position relative to the optical sensor or the plurality of distributed sensors. For further example, an accelerometer or other sensor of the electronic device can detect a movement of the electronic device itself. The electronic device can determine an updated viewing position of the user, process updated image data, and display the updated image data on the display screen. In some cases, the electronic device can activate the optical sensor or the plurality of distributed sensors to detect updated image data in response to detecting a device movement.

Further, the electronic device can update or modify the processed image data based on changes to the configuration or shape of the display screen. For example, the film can detect configuration changes and generate electrical signals corresponding to the changes. For further example, a set of the plurality of distributed sensors can generate updated image data of the user based on configuration changes. The electronic device can analyze the electrical signals or the updated image data to estimate or calculate the updated configuration or shape, and can modify the displayed content according to the updated configuration or shape.

In some embodiments, the optical sensor or a set of the plurality of distributed sensors can sense an additional user in a proximity to the electronic device. The electronic device can perform a facial recognition or similar technique on image data corresponding to the additional user to determine whether the additional user is an authorized user of the electronic device. If the additional user is not an authorized user, the electronic device can modify the displayed content to not display in a direction of the additional user. Further, the electronic device can identify content that is approved for viewing by the additional user (e.g., advertisements), and can display the content in the direction of the additional user.

Figure 9:
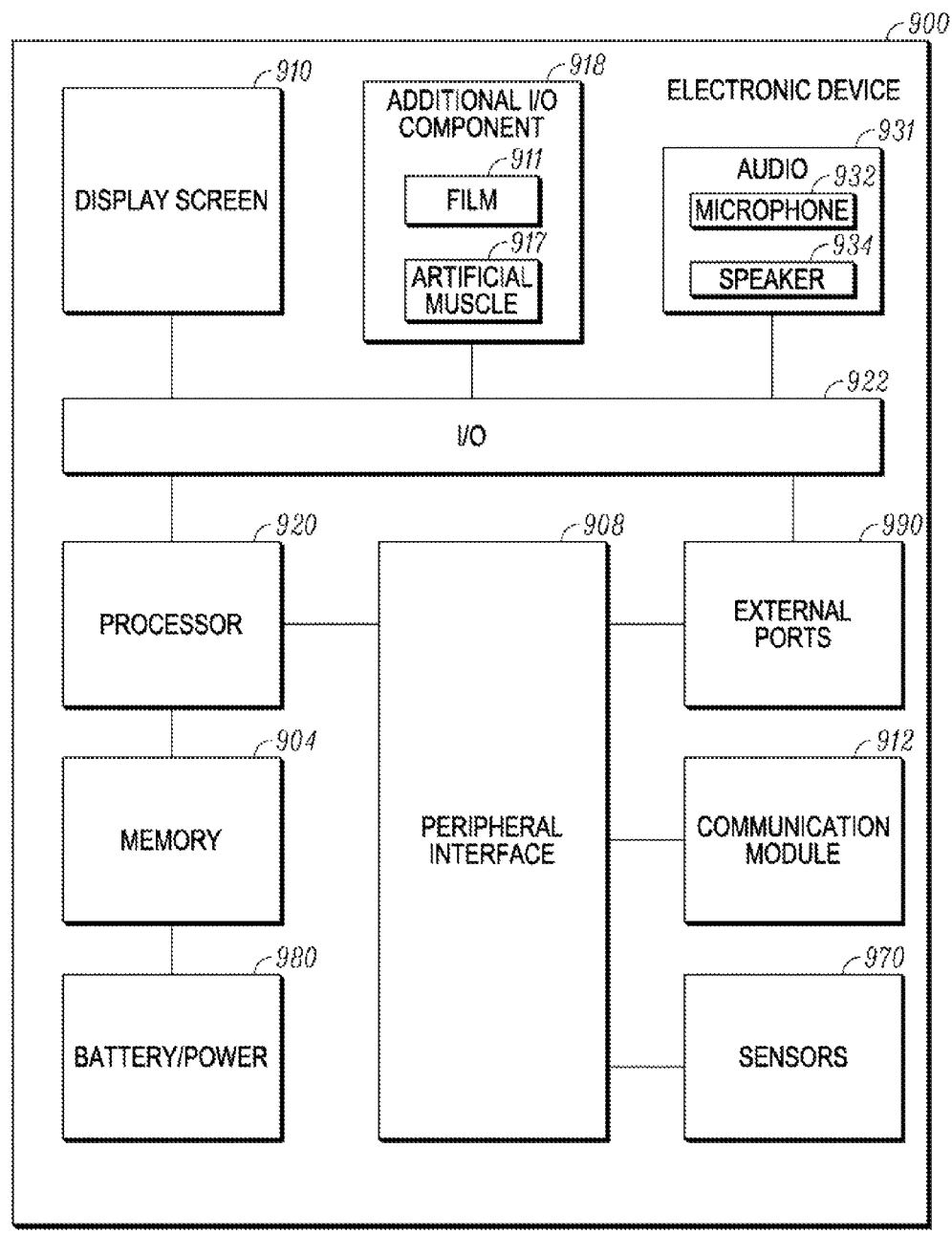
FIG. 9 is a block diagram of an electronic device in accordance with some embodiments.

FIG. 9 illustrates an example electronic device 900 in which the aspects may be implemented. The electronic device 900 can include a processor 920, memory 904 (e.g., hard drives, flash memory, MicroSD cards, and others), a power module 980 (e.g., flexible batteries, wired or wireless charging circuits, etc.), a peripheral interface 908, and one or more external ports 990 (e.g., Universal Serial Bus (USB), HDMI, Firewire, and/or others). The electronic device 900 can further include a communication module 912 configured to interface with the one or more external ports 990. For example, the communication module 912 can include one or more transceivers functioning in accordance with IEEE standards, 3GPP standards, or other standards, and configured to receive and transmit data via the one or more external ports 990. More particularly, the communication module 912 can include one or more WWAN transceivers configured to communicate with a wide area network including one or more cell sites or base stations to communicatively connect the electronic device 900 to additional devices or components. Further, the communication module 912 can include one or more WLAN and/or WPAN transceivers configured to connect the electronic device 900 to local area networks and/or personal area networks, such as a Bluetooth® network.

The electronic device 900 can further include one or more sensors 970 such as, for example, accelerometers, gyroscopic sensors (e.g., three angular-axis sensors), proximity sensors (e.g., light detecting sensors, or infrared receivers or transceivers), imaging sensors such as the sensor 119 and/or the plurality of distributed sensors 225, tilt sensors, and/or other sensors. The electronic device 900 can include an audio module 931 including hardware components such as a speaker 934 for outputting audio and a microphone 932 for receiving audio. In embodiments, the speaker 934 and the microphone 932 can be piezoelectric components. The electronic device 900 further includes an input/output (I/O) controller 922, a flexible display screen 910, and additional I/O components 918 (e.g., an artificial muscle 917, a film 911, capacitors, keys, buttons, lights, LEDs, cursor control devices, haptic devices, and others). The display screen 910 and the additional I/O components 918 may be considered to form portions of a user interface (e.g., portions of the electronic device 900 associated with presenting information to the user and/or receiving inputs from the user).

In embodiments, the flexible display screen 910 is a touchscreen display using singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others. Further, the display screen 910 can include a thin, transparent touch sensor component superimposed upon a display section that is viewable by a user. For example, such displays include capacitive displays, resistive displays, surface acoustic wave (SAW) displays, optical imaging displays, and the like.

The flexible display screen 910 can be configured to interact with various manipulators, such as a human finger or hand. Each type of manipulator, when brought into contact with the flexible display screen 910, can cause the display screen 910 to produce a signal that can be received and interpreted as a touch event by the processor 920. The display screen 910 and/or the sensors embedded therein can also detect any overlap regions associated with the electronic device 900. The processor 920 is configured to determine the location of the contact on the surface of the display screen 910, as well as other selected attributes of the touch event (e.g., movement of the manipulator(s) across the surface of the screen, directions and velocities of such movement, touch pressure, touch duration, and others).

The flexible display screen 910 or one of the additional I/O components 918 can also provide haptic feedback to the user (e.g., a clicking response or keypress feel) in response to a touch event. The flexible display screen 910 can have any suitable rectilinear or curvilinear shape, and may be oriented, rolled, or otherwise manipulated in any desired fashion. Particularly, embodiments comprehend any range of shapes, sizes, and orientations for the display screen 910 such as, for example, rolled shapes, bent shapes, tear drop- or cone-like shapes, semi-rolled shapes, and/or the like.

In general, a computer program product in accordance with some embodiments includes a computer usable storage medium (e.g., standard random access memory (RAM), an optical disc, a universal serial bus (USB) drive, or the like) having computer-readable program code embodied therein, wherein the computer-readable program code is adapted to be executed by the processor 920 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 10:
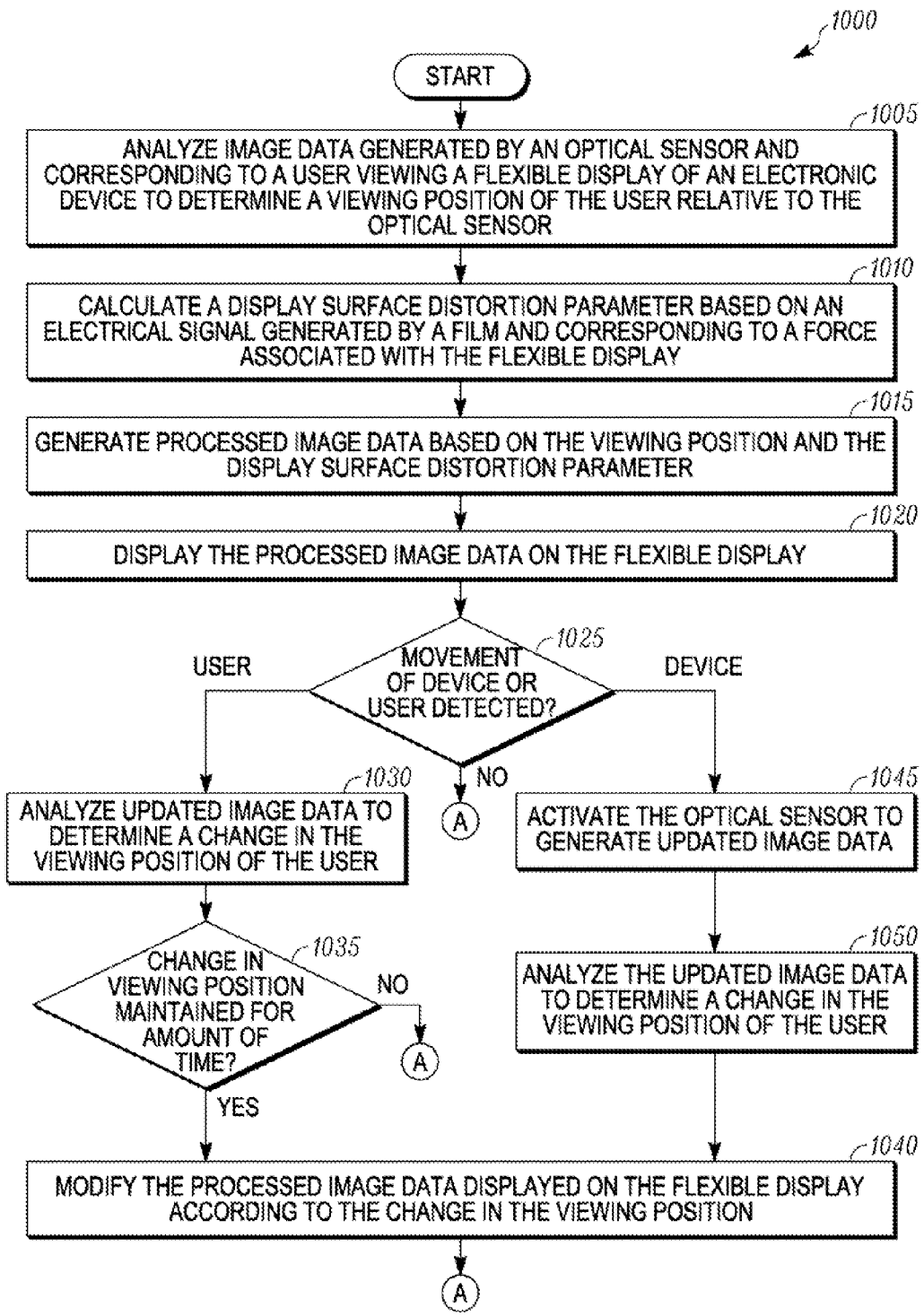
FIG. 10 is a flow diagram depicting content display processing in accordance with some embodiments.
Figure 10:
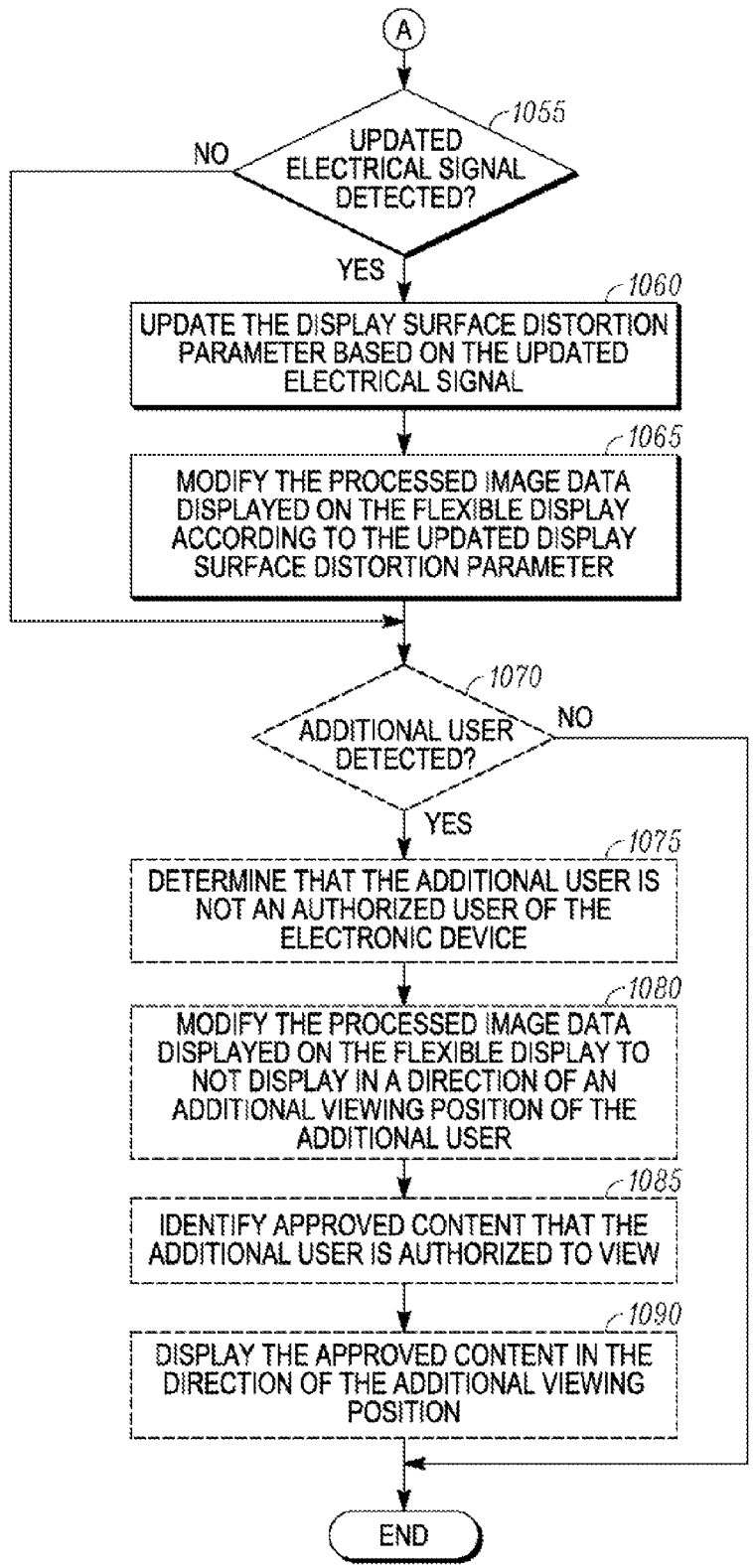

FIG. 10 is a flowchart of a method 1000 for an electronic device (such as the electronic device 100 as shown in FIG. 1) to manage content displayed on a flexible display of the electronic device including an optical sensor and a film. More particularly, the method 1000 relates to the electronic device displaying content that appears "normal" to a user viewing the device from a viewing position and modifying displayed content in response to detected changes in the flexible display or the user's viewing position relative to the flexible display.

The method 1000 begins with the electronic device analyzing 1005 image data generated by an optical sensor and corresponding to a user viewing the flexible display of the electronic device to determine a viewing position of the user relative to the optical sensor. In some cases, the electronic device can identify features on the user's face to determine the viewing position. The electronic device calculates 1010 a display surface distortion parameter based on an electrical signal generated by a film and corresponding to a force associated with the flexible display. In embodiments, the film can be a piezoelectric film that can generate a varying electrical signal at various locations of the film based on amplitudes of the associated forces at the specific locations. The film may also be implemented by strips or pieces of piezoelectric material built into the device.

The display surface distortion parameter may be determined by launching an electromagnetic or sound wave across the display and then receiving the wave when it bounces back from the further edge(s) of the display and analyzing the time delay and changes as the wave propagates through the display. The display surface distortion parameter may also be calculated by imaging sensors taking pictures from the device and determining the shape of the device from the images as previously described. The electronic device generates 1015 processed image data based on the calculated viewing position of the user and the display surface distortion parameter(s). The processed image data can be distorted, as processed, but can appear un-distorted or "normal" when viewed by the user from the viewing position. The electronic device displays 1020 the processed image data on the flexible display.

The electronic device determines 1025 if there is detected movement and, if so, if the movement corresponds to the user or the electronic device. If no movement is detected ("NO"), then processing can proceed to "A". If, however, user movement is detected ("USER"), then the electronic device analyzes 1030 updated image data to determine a change in the viewing position of the user. For example, the optical sensor can automatically detect the user movement and generate the updated image data corresponding to the change. The electronic device determines 1035 if the change in viewing position is maintained for a predetermined amount of time (e.g., 5 seconds). For example, the user may temporally adjust his/her head position, but may not want the displayed image data to accordingly adjust. If the change in viewing position is not maintained for the predetermined amount of time ("NO"), then processing can proceed to "A". In contrast, if the change in viewing position is maintained for the predetermined amount of time ("YES"), then the electronic device modifies 1040 the processed image data displayed on the flexible display according to the change in the viewing position and proceeds to "A". The predetermined amount of time can be set by the device manufacturer, user, and/or change based on recent user behavior (e.g., smaller viewing position changes result in longer predetermined time periods while drastic viewing position changes result in shorter predetermined time periods).

If device movement is detected at 1025 ("DEVICE"), the electronic device activates 1045 the optical sensor to generate updated image data. In embodiments, the device movement can be detected via various sensors, such as an accelerometer (e.g., if the device is rotated), or via other detection techniques. The electronic device analyzes 1050 the updated image data to determine a change in the viewing position of the user. For example, the change in the relative viewing position can result from the movement of the device. The electronic device modifies 1040 the processed image data displayed on the flexible display according to the change in the viewing position and proceeds to "A".

Starting at "A" in FIG. 10 (cont.), the electronic device determines 1055 if an updated electrical signal is detected. For example, the film can detect a force associated with a movement of the flexible display. If the updated electrical signal is detected ("YES"), the electronic device updates 1060 the display surface distortion parameter(s) based on the updated electrical signal and modifies 1065 the processed image data displayed on the flexible display according to the updated display surface distortion parameter(s).

If an updated electrical signal is not detected ("NO") or after the electronic device modifies the processed image data, the electronic device optionally determines 1070 if an additional user is detected, for example an additional user who is able to view the flexible display. In embodiments, the additional user can be detected by the optical sensor. If the additional user is not detected ("NO"), then processing can end, repeat, or return to any previous processing functionality. If the additional user is detected ("YES"), the electronic device optionally determines 1075 that the additional user is not an authorized user of the electronic device. In embodiments, the electronic device performs a facial recognition technique on image data associated with the additional user and compares a result with a listing of authorized users of the electronic device. The electronic device optionally modifies 1080 the processed image data displayed on the flexible display to not display in a direction of an additional viewing position of the additional user. For example, the electronic device can determine the additional viewing position via identifying features on the additional user's face. The electronic device optionally identifies 1085 approved content that the additional user is authorized to view. For example, the approved content can be advertisements and/or any other content that is not considered private, confidential, or otherwise intended for the user. The electronic device optionally displays 1090 the approved content in the direction of the additional viewing position.

Figure 11:
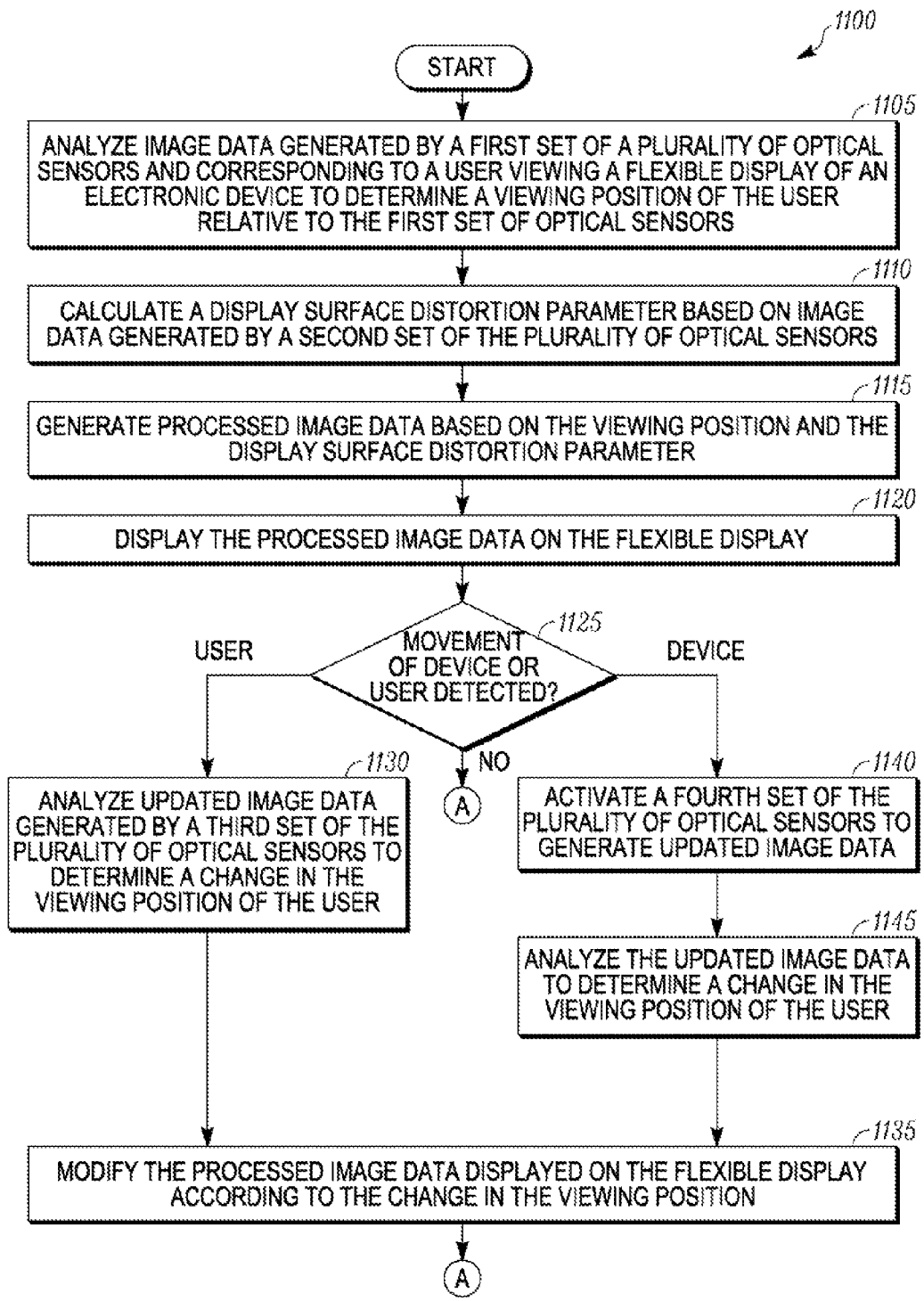
FIG. 11 is a flow diagram depicting content display processing in accordance with some embodiments.
Figure 11:
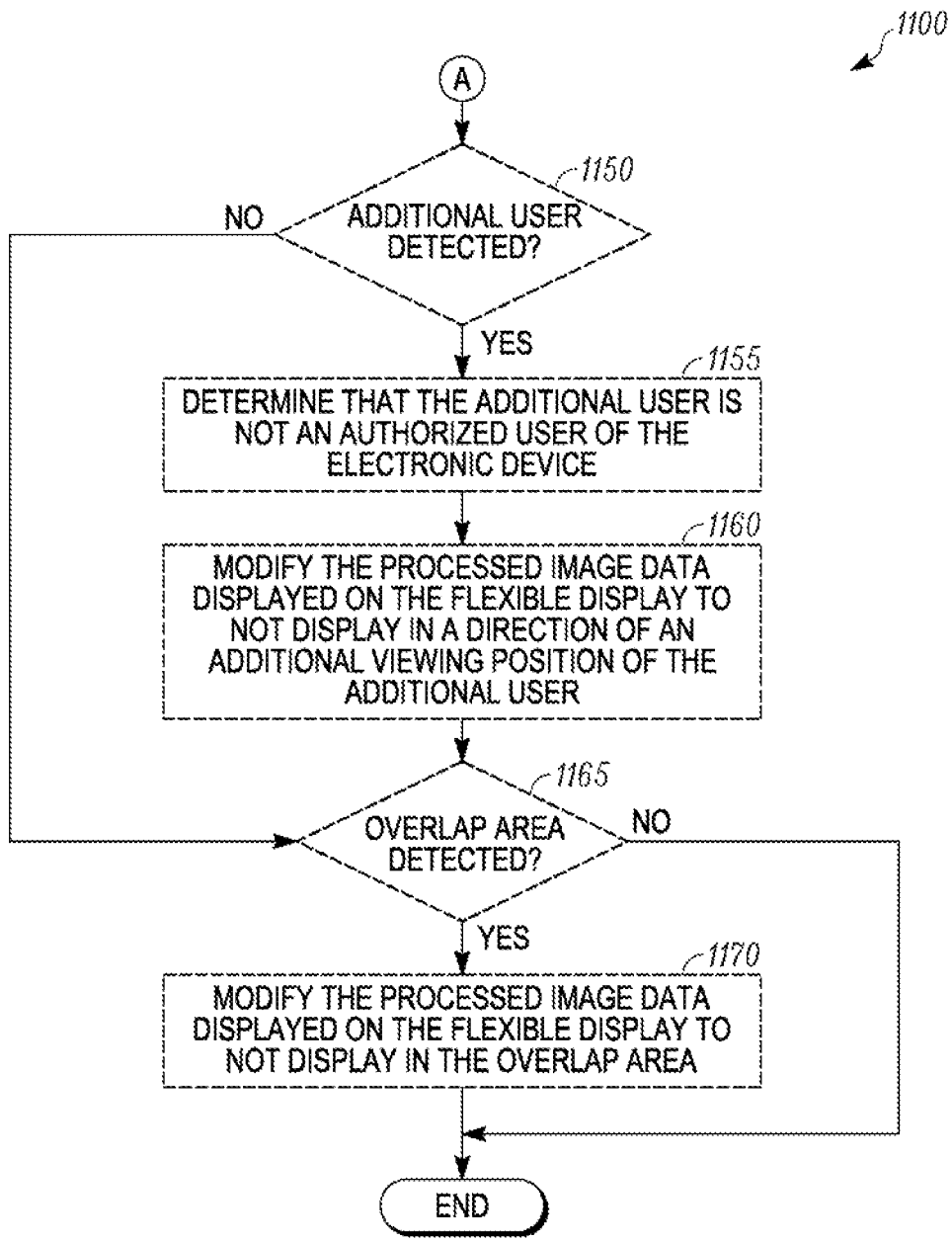

FIG. 11 is a flowchart of a method 1100 for an electronic device (such as the electronic device 100 as shown in FIG. 1) to manage content displayed on a flexible display of the electronic device including a distributed set of optical sensors. More particularly, the method 1100 relates to the electronic device displaying content that appears "normal" to a user viewing the device from a viewing position and modifying displayed content in response to detected changes in the flexible display of the user viewing position relative to the flexible display.

The method 1100 begins with the electronic device analyzing 1105 image data generated by a first set of a plurality of optical sensors and corresponding to a user viewing the flexible display of an electronic device to determine a viewing position of the user relative to the first set of optical sensors. In some cases, the electronic device can identify features on the user's face to determine the viewing position. The electronic device calculates 1110 a display surface distortion parameter based on image data generated by a second set of the plurality of optical sensors. In embodiments, the second set of optical sensors can be distinct from the first set of optical sensors, or can overlap partially or totally with the first set of optical sensors. The electronic device generates 1115 processed image data based on the viewing position and the display surface distortion parameter. The processed image data can be distorted, as processed, but can appear un-distorted or "normal" when viewed by the user at the viewing position. The electronic device displays 1120 the processed image data on the flexible display.

The electronic device determines 1125 if there is detected movement and, if so, if the movement corresponds to the user or the electronic device. If no movement is detected ("NO"), then processing can proceed to "A". If user movement is detected ("USER"), then the electronic device analyzes 1130 updated image data generated by a third set of the plurality of optical sensors to determine a change in the viewing position of the user. For example, the third set of optical sensors can automatically detect the user movement and generate the updated image data corresponding to the change. In some embodiments, the third set of optical sensors can be distinct from the first and/or second sets of optical sensors, or can overlap partially or totally with the first and/or second sets of optical sensors. The electronic device modifies 1135 the processed image data displayed on the flexible display according to the change in the viewing position and proceeds to "A".

If device movement is detected at 1125 ("DEVICE"), the electronic device activates 1140 a fourth set of the plurality of optical sensors to generate updated image data. In embodiments, the device movement can be detected via various sensors, such as an accelerometer (e.g., if the device is rotated), or via other detection techniques. The electronic device analyzes 1145 the updated image data to determine a change in the viewing position of the user. For example, the change in the relative viewing position can result from the movement of the device. The electronic device modifies 1135 the processed image data displayed on the flexible display according to the change in the viewing position and proceeds to "A". The fourth set of optical sensors may be equivalent or different from the first set or the second set of optical sensors.

Starting at "A" in FIG. 11 (cont.), the electronic device optionally determines 1150 if an additional user is detected, for example an additional user who is able to view the flexible display. In embodiments, the additional user can be detected by any of the plurality of optical sensors. If an additional user is not detected ("NO"), the processing can proceed to 1165. If the additional user is detected ("YES"), the electronic device optionally determines 1155 that the additional user is not an authorized user of the electronic device. In embodiments, the electronic device performs a facial recognition technique on image data associated with the additional user and compares a result with a listing of authorized users of the electronic device. The electronic device optionally modifies 1160 the processed image data displayed on the flexible display to not display in a direction of an additional viewing position of the additional user. For example, the electronic device can determine the additional viewing position via identifying features on the additional user's face. In embodiments, the electronic device can identify approved content (e.g., advertisements) that the additional user is authorized to view and display the approved content in the direction of the additional viewing position per FIG. 10.

The electronic device optionally determines 1165 if an overlap area has been detected. For example, any of the plurality of optical sensors can detect the overlap area via detecting light blockage in an area where the flexible display has overlapped within itself. If the overlap area is detected ("YES"), the electronic device optionally modifies 1170 the processed image data displayed on the flexible display to not display in the overlap area. If no overlap area is detected ("NO"), then processing can end, repeat, or return to any previous processing functionality.

Thus, it should be clear from the preceding disclosure that a method and apparatus effectively and efficiently manages the display of content on a flexible display of an electronic device. The method and apparatus advantageously allows a user of the electronic device to view content that appears normal and proportioned even though the content may be processed based on the user's viewing position and/or on the shape of the flexible display. Further, the method and apparatus advantageously updates the displayed content based on user or device movements, privacy considerations, and/or other factors.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An electronic device comprising:
   a flexible display having a flexible display surface capable of displaying content;
   an optical sensor configured to generate image data;
   a film disposed in proximity to at least part of the flexible display and configured to convert a force associated with the flexible display into an electrical signal; and
   a processor coupled to the flexible display, the optical sensor, and the film, the processor configured to perform operations comprising:
      analyzing the image data to determine a viewing position of a user relative to the optical sensor,
      calculating a display surface distortion parameter based on the electrical signal associated with the film,
      generating processed image data based on the viewing position and the display surface distortion parameter, wherein the processed image data is displayed on the flexible display,
      determining whether a change in the viewing position has occurred,
      determining whether the change in the viewing position has been maintained for a predetermined period of time, and
      generating new processed image data upon a determination that the viewing position has been maintained for the predetermined period of time.

2. The electronic device of claim 1, wherein the processor is further configured to perform operations comprising:
   detecting updated image data generated by the optical sensor,
   analyzing the updated image data to determine a change in the viewing position of the user, and
   modifying the processed image data displayed on the flexible display according to the change in the viewing position.

3. The electronic device of claim 2, wherein the electronic device further comprises:
   means for determining an amount of time that the change in the viewing position is maintained, wherein the processed image data displayed on the flexible display is modified in response to the amount of time meeting a predetermined threshold.

4. The electronic device of claim 1, wherein the processor is further configured to perform operations comprising:
   detecting a movement associated with the electronic device,
   in response to the detecting, activating the optical sensor to generate updated image data,
   analyzing the updated image data to determine a change in the viewing position of the user, and
   modifying the processed image data displayed on the flexible display according to the change in the viewing position.

5. The electronic device of claim 1, wherein the processor is further configured to perform operations comprising:
   updating the display surface distortion parameter based on an updated electrical signal associated with the film, and
   modifying the processed image data displayed on the flexible display according to the display surface distortion parameter that was updated.

6. The electronic device of claim 1, wherein the film comprises:
   a first location point that creates a first electrical signal in response to a first force exerted on the flexible display, and
   a second location point that creates a second electrical signal in response to a second force exerted on the flexible display,
   wherein the calculating the display surface distortion parameter comprises:
      scanning the first location point of the film to determine the first electrical signal,
      scanning the second location point to determine the second electrical signal, and
      compiling a distortion matrix populated by values corresponding to the first electrical signal and the second electrical signal.

7. The electronic device of claim 1, wherein the analyzing the image data to determine the viewing position comprises:
   identifying, from the image data, at least three coordinates corresponding to features on a face of the user,
   calculating a plane surface based on the at least three coordinates, and
   determining the viewing position by identifying a difference between the plane surface and a normal vector of the optical sensor.

8. The electronic device of claim 1, wherein the optical sensor is further configured to sense an additional user in proximity to the electronic device and generate additional image data, and wherein the processor is further configured to perform operations comprising:
   analyzing the additional image data to determine an additional viewing position of the additional user relative to the optical sensor,
   determining, based on the additional image data using a facial recognition technique, that the additional user is not an authorized user of the electronic device, and
   modifying the processed image data displayed on the flexible display to not display in a direction of the additional viewing position.

9. The electronic device of claim 8, wherein the processor is further configured to perform operations comprising:
   identifying approved content that the additional user is authorized to view, wherein the approved content is displayed on the flexible display in the direction of the additional viewing position.

10. An electronic device comprising:
    a flexible display having a flexible display surface capable of displaying content;
    a plurality of optical sensors distributed across at least part of the flexible display and each capable of generating image data, and a processor coupled to the flexible display and the plurality of optical sensors, the processor configured to perform operations comprising:
  analyzing the image data from a first set of the plurality of optical sensors to determine a viewing position of a user relative to the first set of the plurality of optical sensors,
  calculating a display surface distortion parameter based on the image data from a second set of the plurality of optical sensors,
  generating processed image data based on the viewing position and the display surface distortion parameter, wherein the processed image data is displayed on the flexible display,
  determining whether a change in the viewing position has occurred,
  determining whether the change in the viewing position has been maintained for a predetermined period of time, and
  generating new processed image data upon a determination that the viewing position has been maintained for the predetermined period of time.

11. The electronic device of claim 10, wherein the processor is further configured to perform operations comprising:
  capturing updated image data generated by a third set of the plurality of optical sensors,
  analyzing the updated image data to determine a change in the viewing position of the user, and
  modifying the processed image data displayed on the flexible display according to the change in the viewing position.

12. The electronic device of claim 10, wherein the processor is further configured to perform operations comprising:
  detecting a movement associated with the electronic device,
  in response to the detecting, activating a fourth set of the plurality of optical sensors to generate updated image data,
  analyzing the updated image data to determine a change in the viewing position of the user, and
  modifying the processed image data displayed on the flexible display according to the change in the viewing position.

13. The electronic device of claim 10, wherein the calculating the display surface distortion parameter comprises:
  receiving first image data generated by a first optical sensor of the second set of the plurality of optical sensors,
  receiving second image data generated by a second optical sensor of the second set of the plurality of optical sensors,
  analyzing the first image data and the second image data to identify a distribution of amplitude values representing the viewing position of the user, and
  calculating the display surface distortion parameter based on the distribution of amplitude values.

14. The electronic device of claim 10, wherein the analyzing the image data comprises: identifying, from the image data from the first set of the plurality of optical sensors, at least three coordinates corresponding to features on a face of the user,
  calculating a plane surface based on the at least three coordinates, and
  determining the viewing position by identifying a difference between the plane surface and a normal vector of the first set of the plurality of optical sensors.

15. The electronic device of claim 10, wherein a fifth set of the plurality of optical sensors is capable of sensing an additional user and generating additional image data, wherein the processor is further configured to perform operations comprising:
  analyzing the additional image data from the fifth set of the plurality of optical sensors to determine an additional viewing position of the additional user,
  determining, based on the additional image data using a facial recognition technique, that the additional user is not an authorized user of the electronic device, and
  modifying the processed image data displayed on the flexible display to not display in a direction of the additional viewing position.

16. The electronic device of claim 10, wherein a sixth set of the plurality of optical sensors is capable of detecting an overlap area of the flexible display where the flexible display overlaps within itself, wherein the processor is further configured to perform operations comprising:
  identifying the overlap area detected by the sixth set of the plurality of optical sensors, and
  modifying the processed image data displayed on the flexible display to not display in the overlap area.

17. A method of managing content displayed on a flexible display of an electronic device, the method comprising:
  analyzing image data generated by an optical sensor to determine a viewing position of a user relative to the optical sensor;
  detecting an electrical signal corresponding to a physical configuration of a flexible display;
  calculating a display surface distortion parameter based on the electrical signal;
  generating processed image data based on the viewing position and the display surface distortion parameter; and
  displaying the processed image data on the flexible display,
  determining whether a change in the viewing position has occurred,
  determining whether the change in the viewing position has been maintained for a predetermined period of time, and
  generating new processed image data upon a determination that the viewing position has been maintained for the predetermined period of time.

18. The method of claim 17, further comprising:
  detecting updated image data generated by the optical sensor;
  analyzing the updated image data to determine a change in the viewing position of the user; and
  modifying the processed image data displayed on the flexible display according to the change in the viewing position.

19. The method of claim 18, wherein the modifying the processed image data displayed on the flexible display comprises:
  determining an amount of time that the change in the viewing position is maintained; and
  modifying the processed image data displayed on the flexible display in response to the amount of time meeting a predetermined threshold.

20. The method of claim 17, further comprising:
  detecting a movement associated with the electronic device;
  in response to the detecting, activating the optical sensor to generate updated image data;
analyzing the updated image data to determine a change in the viewing position of the user; and modifying the processed image data displayed on the flexible display according to the change in the viewing position.

21. The method of claim 17, further comprising:
updating the display surface distortion parameter based on an updated electrical signal associated with the flexible display; and
modifying the processed image data displayed on the flexible display according to the display surface distortion parameter that was updated.

22. The method of claim 17, wherein the analyzing the image data generated by the optical sensor comprises:
identifying, from the image data, at least three coordinates corresponding to features on a face of the user;
calculating a plane surface based on the at least three coordinates; and
determining the viewing position by identifying a difference between the plane surface and a normal vector of the optical sensor.

23. An electronic device comprising:
a flexible display having a flexible display surface capable of displaying content;
flex sensors disposed in proximity to at least part of the flexible display and configured to create an electrical signal based at least part upon local flexings of the flexible display; and
a processor coupled to the flexible display and to the flex sensors, the processor configured to perform operations comprising:
determine a shape of the flexible display,
shrink text upon a determination that the viewable space of the flexible display is reduced,
angle text upon a determination that a z-axis of the flexible display is tilted,
widen letters upon a determination that corresponding areas angle away from a user,
split words upon a determination that a viewable area includes both a left and a right side of the flexible display, and
provide a blank area in an overlapped portion of the flexible display upon a determination that an exterior portion of the flexible display overlaps the overlapped portion.

* * * * *